(12) United States Patent
Jollivet et al.

(10) Patent No.: US 10,630,040 B2
(45) Date of Patent: Apr. 21, 2020

(54) MODE MIXING OPTICAL FIBERS AND METHODS AND SYSTEMS USING THE SAME

(71) Applicant: NUFERN, East Granby, CT (US)

(72) Inventors: Clemence Jollivet, East Granby, CT (US); Kevin Farley, East Granby, CT (US); Jaroslaw Abramczyk, East Granby, CT (US); Michael Conroy, East Granby, CT (US); Kanishka Tankala, East Granby, CT (US); Peyman Ahmadi, East Granby, CT (US); Eric Lim, East Granby, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 16/075,573

(22) PCT Filed: Feb. 6, 2017

(86) PCT No.: PCT/US2017/016718
§ 371 (c)(1),
(2) Date: Aug. 3, 2018

(87) PCT Pub. No.: WO2017/136831
PCT Pub. Date: Aug. 10, 2017

(65) Prior Publication Data
US 2019/0052043 A1    Feb. 14, 2019

Related U.S. Application Data

(60) Provisional application No. 62/291,953, filed on Feb. 5, 2016, provisional application No. 62/295,437, filed on Feb. 15, 2016.

(51) Int. Cl.
*H01S 3/067* (2006.01)
*G02B 6/02* (2006.01)
(Continued)

(52) U.S. Cl.
CPC ........ *H01S 3/06708* (2013.01); *C03B 37/027* (2013.01); *G02B 6/02023* (2013.01);
(Continued)

(58) Field of Classification Search
None
See application file for complete search history.

(56) References Cited

U.S. PATENT DOCUMENTS

| 4,372,645 A * | 2/1983 | Miller | C03B 37/023 |
| | | | 385/123 |
| 4,877,305 A * | 10/1989 | Ricciardelli | G02B 6/14 |
| | | | 385/123 |

(Continued)

FOREIGN PATENT DOCUMENTS

| EP | 0918382 A2 | 4/2000 |
| WO | 02/091046 | 11/2002 |

(Continued)

OTHER PUBLICATIONS

Claim listing dated Apr. 1, 2019 in U.S. Appl. No. 15/752,546. (Year: 2019).*

(Continued)

*Primary Examiner* — Michael Stahl
(74) *Attorney, Agent, or Firm* — McDonnell Boehnen Hulbert & Berghoff LLP

(57) ABSTRACT

The present disclosure relates more to mode mixing optical fibers useful, for example in providing optical fiber laser outputs having a desired beam product parameter and beam profile. In one aspect, the disclosure provides a mode mixing optical fiber that includes a core having a refractive index profile; and a cladding disposed about the core. The core of the mode mixing optical fiber supports at least two (e.g., at least five) guided modes at the wavelength. The mode mixing optical fiber is configured to substantially distribute (Continued)

optical radiation having the wavelength propagating therein (e.g., input at its input end or generated or amplified within the core) among a plurality of the guided modes (e.g., to distribute a substantial fraction of the optical radiation having the wavelength propagating therein from its lower-order guided modes to its higher-order guided modes).

20 Claims, 30 Drawing Sheets

(51) Int. Cl.
    *G02B 6/14*     (2006.01)
    *H01S 3/08*     (2006.01)
    *C03B 37/027*     (2006.01)
    *G02B 6/036*     (2006.01)
    *G02B 27/09*     (2006.01)
    *H01S 3/094*     (2006.01)

(52) U.S. Cl.
    CPC ..... *G02B 6/03633* (2013.01); *G02B 6/03638* (2013.01); *G02B 6/14* (2013.01); *H01S 3/06729* (2013.01); *H01S 3/0804* (2013.01); *G02B 6/02042* (2013.01); *G02B 27/0927* (2013.01); *H01S 3/06733* (2013.01); *H01S 3/06737* (2013.01); *H01S 3/09408* (2013.01); *H01S 3/094007* (2013.01)

(56) References Cited

U.S. PATENT DOCUMENTS

| | | | |
|---|---|---|---|
| 5,138,675 A * | 8/1992 | Schofield | G02B 6/14 372/6 |
| 5,533,163 A * | 7/1996 | Muendel | G02B 6/03605 372/6 |
| 5,790,735 A | 8/1998 | Oleskevich et al. | |
| 6,064,786 A * | 5/2000 | Cunningham | G02B 6/14 383/27 |
| 6,157,763 A * | 12/2000 | Grubb | G02B 6/03622 372/6 |
| 6,480,659 B1 | 11/2002 | Patlakh | |
| 6,483,973 B1 * | 11/2002 | Mazzarese | H01S 3/06708 372/6 |
| 7,317,857 B2 * | 1/2008 | Manyam | G02B 6/02033 385/126 |
| 7,606,273 B2 | 10/2009 | Zhu | |
| 7,676,129 B1 | 3/2010 | Bookbinder | |
| 2003/0152349 A1 | 8/2003 | Lauzon et al. | |
| 2004/0036955 A1 | 2/2004 | Digonnet et al. | |
| 2006/0204190 A1 | 9/2006 | Ranka | |
| 2008/0219299 A1 | 9/2008 | Lewis | |
| 2010/0079855 A1 * | 4/2010 | Dong | C03C 25/104 359/341.3 |
| 2012/0069861 A1 | 3/2012 | Neuberger | |
| 2015/0077837 A1 * | 3/2015 | Abedin | H01S 3/06716 359/341.5 |
| 2016/0294152 A1 * | 10/2016 | Bhawalkar | H01S 3/1611 |
| 2019/0011637 A1 * | 1/2019 | Jollivet | H01S 3/06729 |

FOREIGN PATENT DOCUMENTS

| | | |
|---|---|---|
| WO | 03/098295 | 11/2003 |
| WO | WO 2010/057288 | 5/2010 |

OTHER PUBLICATIONS

Farley et al., "Optical fiber designs for beam shaping," Optomechatronic Micro/Nano Devices and Components III: Oct. 8-10, 2007, Lausanne, Switzerland; [Proceedings of SPIE, ISSN 0277-786X], SPIE, Bellingham, Wash, vol. 8961, Mar. 11, 2014, pp. 89612U-89612U, XP060034263.

International Search Report for International Application No. PCT/US2017/016718 dated Apr. 24, 2017, 3 pages.

* cited by examiner

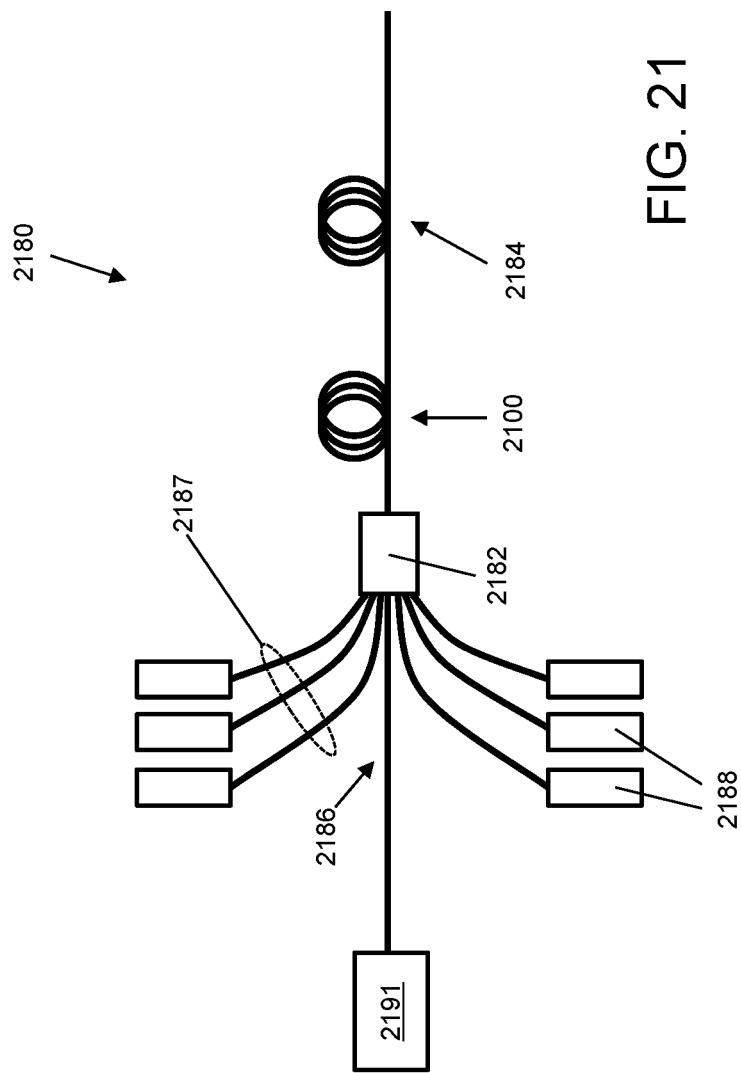

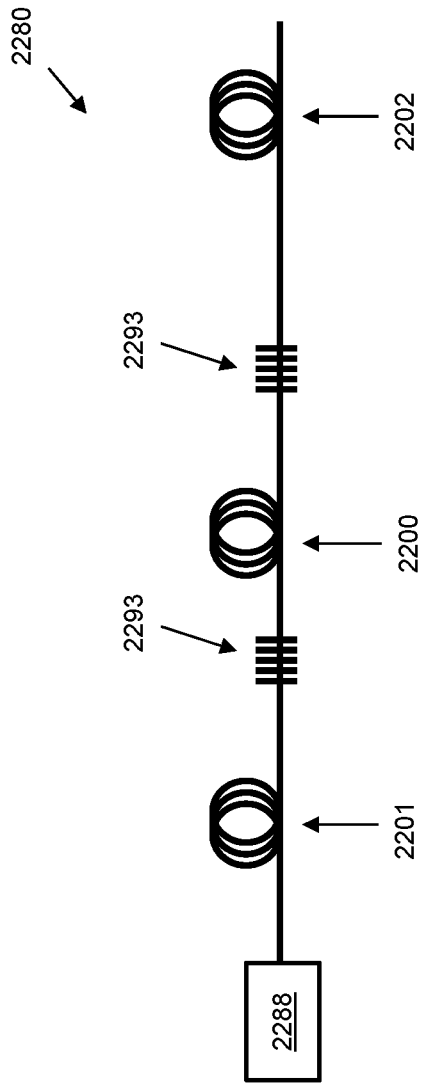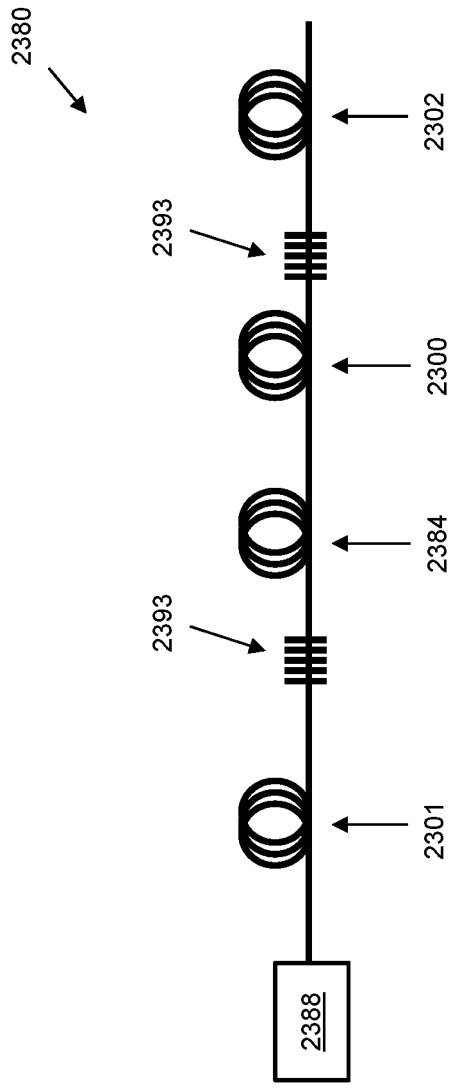

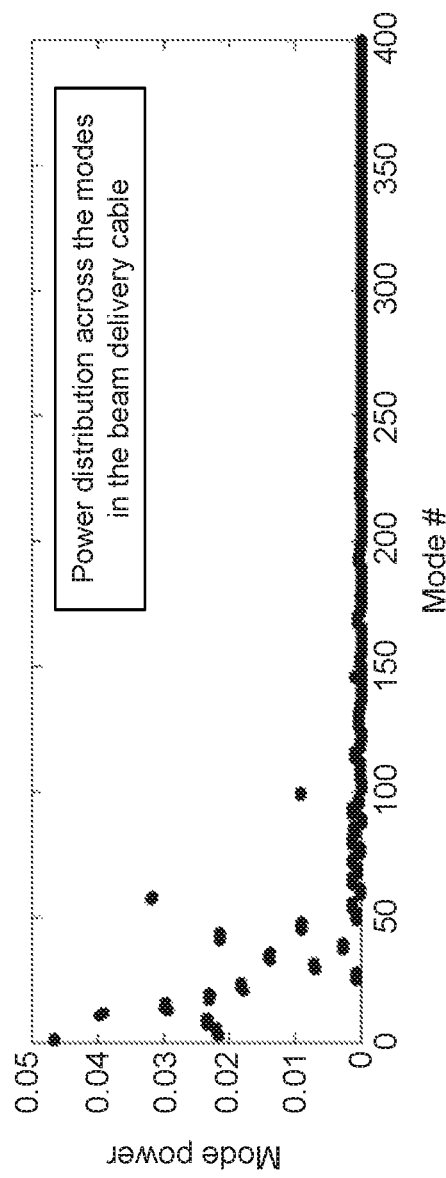
FIG. 26
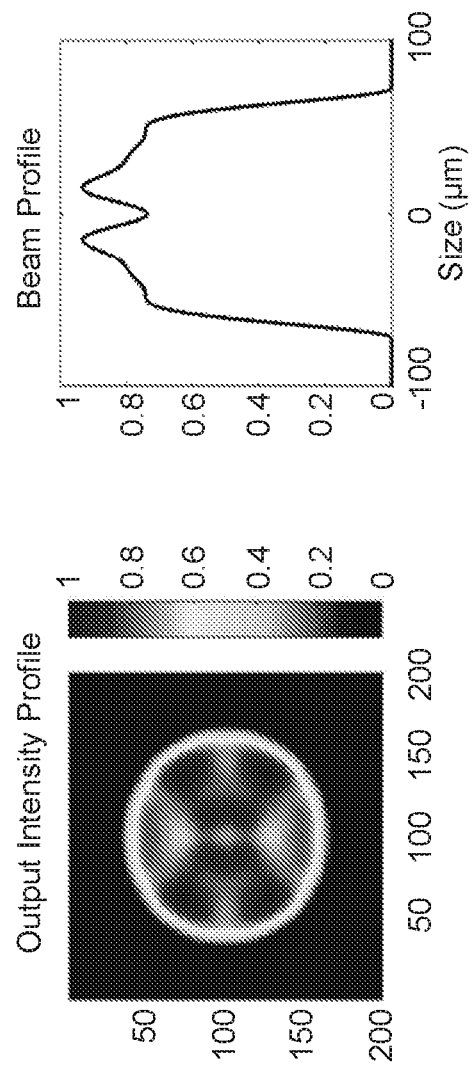
FIG. 27
FIG. 28

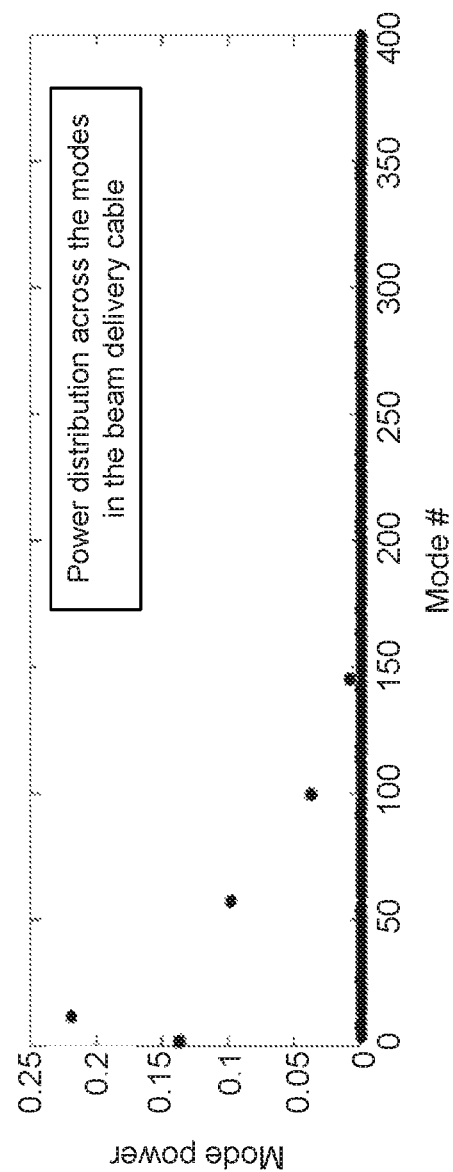
FIG. 29
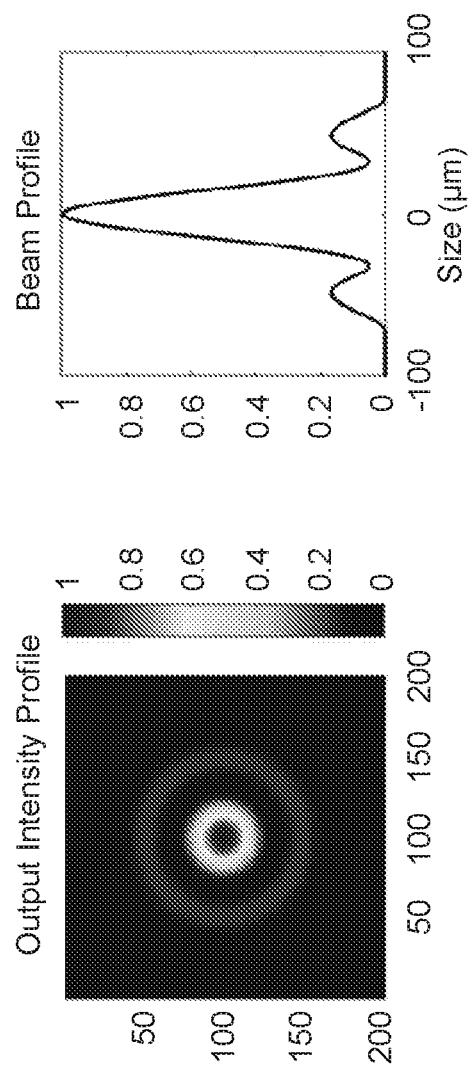
FIG. 31
FIG. 30

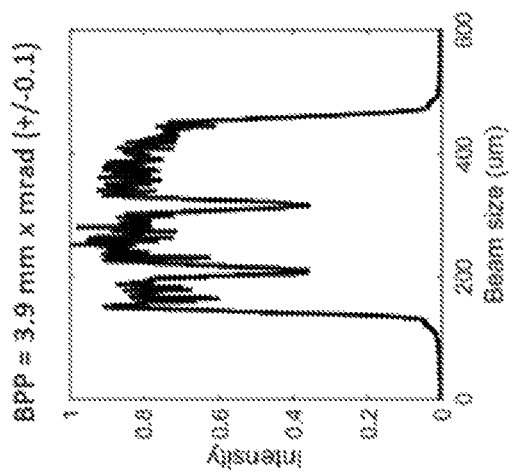
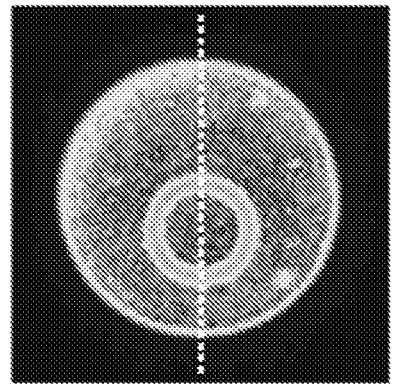
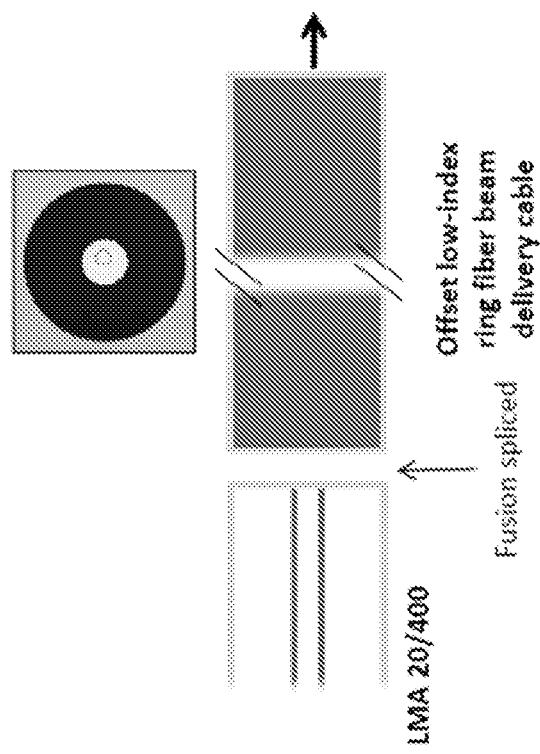
FIG. 39

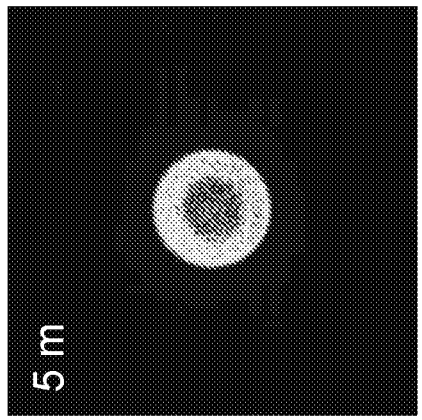
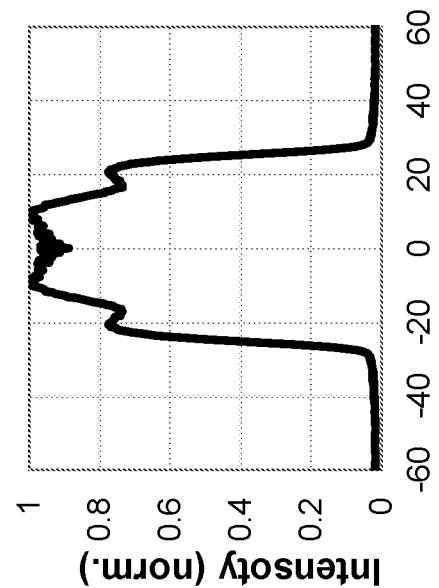
FIG. 44
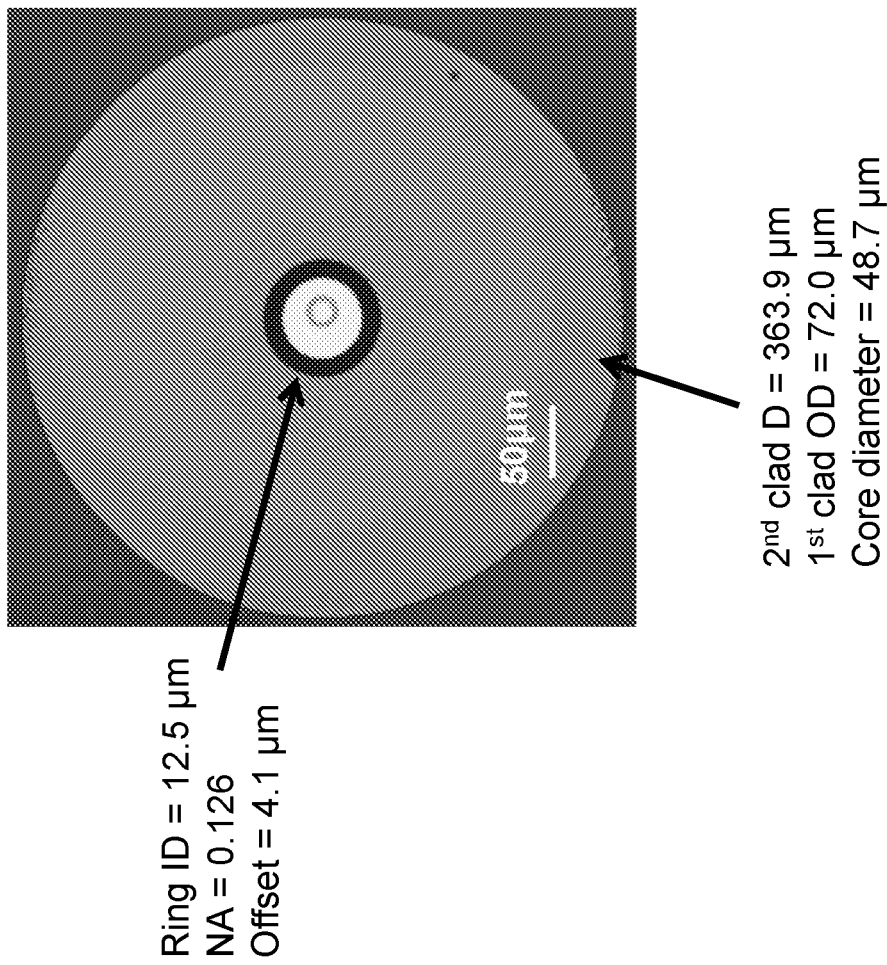
2nd clad D = 363.9 μm
1st clad OD = 72.0 μm
Core diameter = 48.7 μm
Ring ID = 12.5 μm
NA = 0.126
Offset = 4.1 μm
FIG. 43

MODE MIXING OPTICAL FIBERS AND METHODS AND SYSTEMS USING THE SAME

CROSS-REFERENCE TO RELATED APPLICATIONS

This application is a U.S. national phase application of International Patent Application no. PCT/US2017/016718, filed Feb. 6, 2017. International Patent Application no. PCT/US2017/016718 claims the benefit of priority of U.S. Provisional Patent Application No. 62/291,953 filed Feb. 5, 2016, and U.S. Provisional Patent Application No. 62/295437, filed Feb. 15, 2016, each of which is hereby incorporated herein by reference in its entirety.

BACKGROUND OF THE DISCLOSURE

1. Field of the Disclosure

The present disclosure relates generally to optical fibers and optical fiber lasers and amplifiers. The present disclosure relates more particularly to mode mixing optical fibers useful, for example in providing optical fiber laser and amplifier outputs having a desired beam product parameter and beam profile, as well as in the construction of laser and amplifier systems.

2. Technical Background

High power lasers and optical amplifiers are widely used in a variety of industries for a variety of purposes, such as laser cutting, welding and machining of various materials. Research and development in rare-earth doped optical fibers along with the discovery of specialty fiber designs such as Large-Mode Area (LMA) fibers has triggered the introduction of a variety of high power fiber laser and amplifier modules. Multi-kW fiber lasers and amplifiers have been realized with very high efficiencies and are fueling the growth of laser material processing. Of course, other types of high power lasers, such as solid-state lasers, are also commonly used in materials processing applications.

Lasers and amplifiers used in the field of materials processing desirably fulfill specific requirements in terms of output power and beam profile. In terms of power, the laser or amplifier system desirably delivers radiation with a wavelength and an energy that is high enough to process a desired material, typically on the order of kilowatts. Two sorts of kW-level fiber lasers can be distinguished: multi-mode and single-mode. Single-mode fiber lasers typically deliver on the order of 1-3 kW of optical power, while multi-mode fiber lasers typically operate in the range of several tens of kW of output power. For material processing applications, both single mode and multi-mode fiber lasers are used. A multi-mode laser can be configured, for example, by using a multi-mode active fiber, or by combining the outputs of several single mode fiber lasers into a multi-mode delivery fiber for delivery to a workpiece. Similarly, a multi-mode delivery fiber is often used to deliver power from a solid-state laser to a workpiece.

In terms of beam profile, users typically desire the delivered beam to have a desired Beam Parameter Product (BPP). As used herein, the BPP is defined as the product of the beam radius R and the divergence angle of the beam $\theta$, expressed in units of mm·mrad. The beam radius R in mm is half of the Beam Diameter measured at 13.5% of the maximum intensity. The divergence angle $\theta$ in mrad is defined as the half-angle formed with the optical axis as the beam propagates from the end of a beam delivery optical fiber. While desired BPP values will vary from application to application, three typical ranges of BPP values for fiber-coupled lasers are provided below:

1.5 to 2 mm·mrad for a 50 µm core diameter beam delivery cable 3 to 4 mm·mrad for a 100 µm core diameter beam delivery cable 6 to 8 mm·mrad for a 200 µm core diameter beam delivery cable Moreover, in many applications, the delivered beam has an intensity profile that is substantially evenly distributed along the beam. Such a "flat-top" profile is different from a Gaussian profile, in which the maximum intensity is only at the center. A "flat-top" profile can help to enable controlled and accurate cutting, welding or machining process.

In many applications, a beam with a substantially circular profile is also (or alternatively) desired.

In order to use such lasers for material processing applications while satisfying the required beam parameter product (BPP), conventional optical fiber laser and amplifier systems have a single mode or multi-mode laser or amplifier output coupled into a beam delivery cable for transmission of the output to a workpiece. Similarly, conventional solid-state lasers are coupled to a beam delivery cable for transmission of the laser output to a workpiece. Commonly used beam delivery cables are made with highly multi-mode step-index fibers with typical core diameters of 50, 100, 200, 400 and 600 microns and numerical apertures (NA) varying from 0.1 to 0.4 (and often greater than 0.4). A number of techniques have been attempted to provide both a desired BPP and a desired flat-top profile, such as offset splicing between a single mode laser output (launch fiber) and the beam delivery cable, beam delivery optical fibers with shaped cores, external beam shaping techniques, mechanical fiber micro-bending, fiber tapers (adiabatic and/or abrupt), long period gratings and multimode interference in multi-mode fibers. However, each of these suffers from a number of drawbacks.

Accordingly, there remains a need for improved optical fibers, systems and methods that can, for example, provide one or more of a desired BPP value, a desired intensity profile (e.g., a "flat top" intensity profile), and a circular beam shape.

SUMMARY OF THE DISCLOSURE

In one aspect, the disclosure provides a mode mixing optical fiber for delivering optical radiation having a wavelength, the mode mixing optical fiber having an input end, an output end, a centerline and a refractive index profile. The mode mixing optical fiber includes a core (e.g., an innermost core or a pump core) for optical radiation having the wavelength, the inner core having a refractive index profile; and a cladding disposed about the inner core, wherein the core of the mode mixing optical fiber supports at least two (e.g., at least five) guided modes at the wavelength, and wherein the mode mixing optical fiber is configured to substantially distribute optical radiation having the wavelength propagating therein (e.g., input at its input end or generated or amplified within the core) among a plurality of the guided modes (e.g., to distribute a substantial fraction of the optical radiation having the wavelength propagating therein (e.g., input at its input end or generated or amplified within the core) from its lower-order guided modes to its higher-order guided modes).

In another aspect, the disclosure provides an optical system comprising:
- a mode mixing optical fiber as described herein; and
- a first optical fiber having an output end directly optically coupled to the input end of the mode mixing optical fiber, the first optical fiber being configured to propagate optical radiation having the wavelength.

In another aspect, the disclosure provides an optical system comprising:
- a mode mixing optical fiber as described herein; and
- an optical source (e.g., a solid state laser) optically coupled to the input end of the first mode mixing optical fiber.

In another aspect, the disclosure provides a method for providing a free space-propagating optical beam, the method comprising
- providing an optical system as described in the preceding two paragraphs;
- propagating radiation of the wavelength into the mode mixing optical fiber; and
- propagating the free space-propagating optical beam from the output end of the mode mixing optical fiber.

In another aspect, the disclosure provides a method for providing guided optical radiation, the method comprising
- providing a mode mixing optical fiber as described herein;
- propagating radiation of the wavelength in the mode mixing optical fiber for a distance sufficient to distribute a fraction of the optical radiation having the wavelength propagating therein (e.g., input at its input end or generated or amplified within the core) from its lower-order modes to its higher-order modes.

In another aspect, the disclosure provides a method for providing guided optical radiation having a wavelength, the method comprising
- providing a mode mixing optical fiber as described herein, wherein the mode mixing optical fiber is an active mode mixing optical fiber for radiation having the wavelength;
- generating or amplifying optical radiation of the wavelength in the active mode mixing optical fiber; and
- propagating the radiation of the wavelength in the active mode mixing optical fiber for a distance sufficient to substantially distribute the optical radiation having the wavelength among a plurality of the guided modes of the active mode mixing optical fiber (e.g., to distribute a substantial fraction of the optical radiation having the wavelength from its lower-order modes to its higher-order modes).

In another aspect, the disclosure provides a method for providing pump radiation having a pump wavelength to an active optical fiber, the method comprising
- providing a mode mixing optical fiber as described herein, wherein the mode mixing optical fiber is a mode mixing pump fiber;
- propagating radiation of the pump wavelength in the mode mixing pump fiber for a distance sufficient to substantially distribute optical radiation having the wavelength propagating therein among a plurality of the guided modes of the mode mixing pump fiber (e.g., to distribute a substantial distribute a fraction of the optical radiation having the pump wavelength propagating therein (e.g., input at its input end) from its lower-order modes to its higher-order modes).

In another aspect, the disclosure provides a method for providing seed radiation having an active wavelength to a multimode active optical fiber having the active wavelength, the method comprising
- providing a mode mixing optical fiber as described herein;
- propagating seed radiation of the active wavelength in the mode mixing fiber for a distance sufficient to substantially distribute optical radiation having the wavelength propagating therein among a plurality of the guided modes of the mode mixing pump fiber (e.g., to distribute a substantial distribute a fraction of the optical radiation having the pump wavelength propagating therein (e.g., input at its input end) from its lower-order modes to its higher-order modes).

These as well as other aspects, embodiments, advantages, and alternatives, will become apparent to those of ordinary skill in the art by reading the following detailed description, with reference where appropriate to the accompanying figures. Various embodiments of the optical fibers, systems and methods described herein can be useful in laser machining applications as well as in a variety of additional applications that would benefit from, for example, fiber beam control techniques.

BRIEF DESCRIPTION OF THE DRAWINGS

FIG. 21 is a schematic view of an optical system according to another embodiment of the disclosure;

FIG. 22 is a schematic view of an optical system according to another embodiment of the disclosure;

FIG. 23 is a schematic view of an optical system according to another embodiment of the disclosure;

FIG. 26 is a graph showing the calculated power distribution among modes excited in the mode mixing beam delivery cable in the experiments of Example 1.

FIG. 27 is a 2D plot of the calculated total output intensity delivered by the mode mixing beam delivery cable in the experiments of Example 1.

FIG. 28 is a plot of the calculated profile of the beam delivered by the mode mixing beam delivery cable in the experiments of Example 1.

FIG. 29 is a graph showing the calculated power distribution among modes excited in a conventional beam delivery cable in the experiments of Example 1.

FIG. 30 is a 2D plot of the calculated total output intensity delivered by a conventional beam delivery cable in the experiments of Example 1.

FIG. 31 is a plot of the calculated profile of the beam delivered by a conventional beam delivery cable in the experiments of Example 1.

FIG. 39 is a schematic view of an optical system including an offset low-index ring mode mixing fiber and a 2D graph of the total output intensity delivered thereby as described in the experiments of Example 2.

FIG. 43 is a schematic cross-sectional view of a profile of an optical fiber used in the experiments of Example 4.

FIG. 44 is a set of 2D and 1D intensity graphs for the experiments described in Example 4.

Figure 1:
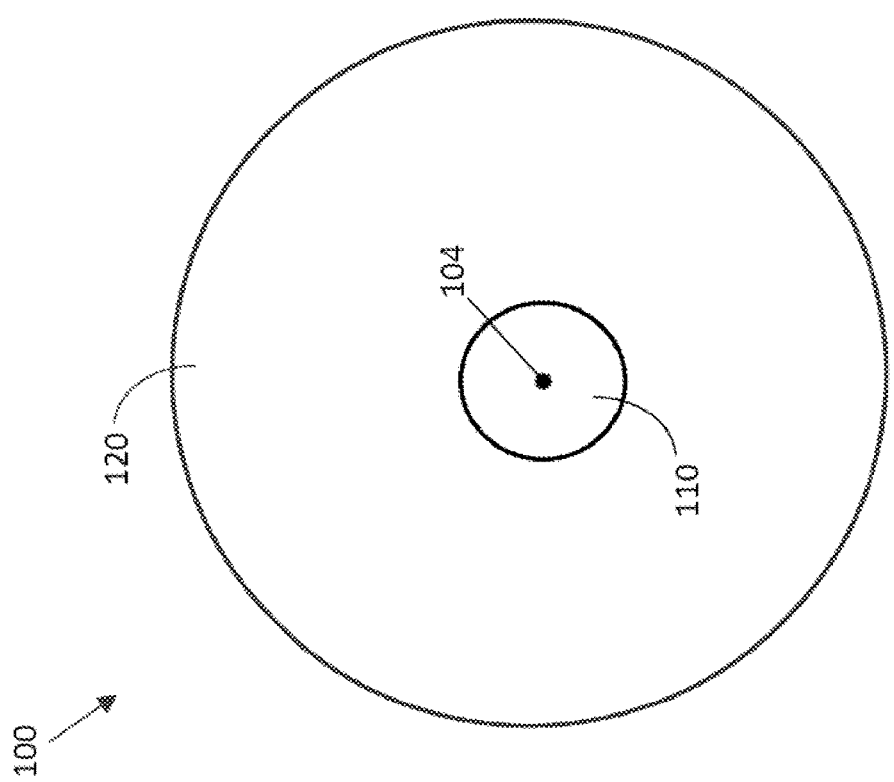
FIG. 1 is a cross-sectional schematic view.

As the person of skill in the art will appreciate, the drawings are not necessarily drawn to scale, and various elements of the system may in certain drawings be omitted for purposes of clarity.

DETAILED DESCRIPTION

In the following discussion it is assumed that the reader has the basic knowledge of the structure of optical fibers familiar to the person of skill in the art. Thus, the concepts of a fiber core, cladding, and coating are not discussed in detail. As is familiar to the person of skill in the art, radiation having a wavelength propagates generally in the core of the fiber, the diameter of which is typically in the range of a few microns to a several hundred microns, even in some embodiments up to 1500 microns. The refractive index difference between the core and the cladding acts to confine the light in one or more propagating modes, generally in the core of the fiber (although the person of ordinary skill in the art will appreciate that some energy is actually present in the cladding in the region near the core).

The terms "light" or "optical", as used herein, are used broadly as understood by one of ordinary skill in the art of optical waveguides, and are not to be limited as pertaining only to the visible range of wavelengths. Refractive indices described herein are described with reference to the wavelength of the radiation. In certain embodiments of the optical fibers, systems and methods described herein, the wavelength is in the visible or near-infrared (e.g., in the range of about 0.5 μm to about 3 μm).

The inventors have noted that in a multimode fiber (such as a multimode beam delivery fiber, a multimode pump fiber or a multimode active optical fiber), if optical radiation is uniformly distributed among a substantial fraction of the available modes (e.g., substantially all available transverse modes), the radiation can exhibit a relatively flat-top intensity profile (e.g., as it emerges from the optical fiber, or as it is propagated in the optical fiber. Populating higher-order modes affects the divergence angle of the output beam (since higher-order modes propagate at larger divergence angles) and increases the BPP. When all modes are evenly populated, the beam divergence equals the fiber core numerical aperture. However, the number of modes excited in a multimode optical fiber and the relative amount of power coupled into each mode is determined in large part by the spatial overlap between the incident laser radiation (e.g., from an input fiber such as an active optical fiber) and the modes of the core of the multimode optical fiber. Since transverse modes are orthogonal, only the modes with a non-zero spatial overlap with the input radiation (e.g., from the active fiber) can typically be populated. The relative amount of power carried by each mode is determined by the fraction of spatial overlap. As a result, the intensity profile and the BPP available at the output of the multimode optical fiber will vary based on the particular type of laser or amplifier being used (i.e., depending on the profile of the laser/amplifier output). For example, when using a single mode laser or amplifier source, the significant difference in size and form factor with the multimode step index fiber in a conventional beam delivery cable results in a low level of mode mixing (i.e., only a few lower order modes are typically populated). Use of a multimode laser or amplifier fiber can help matters somewhat, but due to the fact that such multimode laser or amplifier fibers are typically themselves only few-moded, the beam delivery fiber typically propagates radiation in only its lower order modes. When only lower order modes are populated, the delivered beam is typically much higher in intensity at its center than at its periphery. When coupling a solid-state laser to a beam delivery fiber, for example, through free-space optics, the beam delivery fiber can similarly transmit radiation chiefly in its lower order modes, similarly leading to a delivered beam having a more intense center.

The present inventors have addressed the drawbacks in the prior art by providing optical fibers configured to, for example, couple laser/amplifier radiation (e.g., from single-moded or few-moded fiber, or coupled from a solid-state laser) input at its input end into its higher order modes. Such an optical fiber, when used as a mode transformation fiber or a beam delivery fiber in an optical fiber laser or amplifier system can provide an output having one or more of a desired BPP value, a desired intensity profile (e.g., a "flat top" intensity profile), and a circular beam shape. In certain embodiments, such mode mixing optical fibers can be provided by introducing asymmetry or other inhomogeneities within the core in order to perturb the mode overlap between an input optical fiber and the mode mixing optical fiber, thereby increasing mode mixing. As will be described, the mode mixing optical fibers of the disclosure can be used not only as beam delivery or mode transformation fibers, but in certain embodiments as mode mixing pump fibers, pump combiner optical devices and other optical devices used to couple pump radiation with a desired intensity profile (e.g., a "flat-top" intensity profile) into an active optical fiber; or as mode mixing active optical fibers to provide amplified or generated radiation having a desired intensity profile (e.g., a "flat-top" intensity profile).

As the person of ordinary skill in the art will appreciate, the mode mixing optical fiber designs described herein are scalable, and offer many degrees of freedom to fulfill the needs of the end-user in terms of BPP while maintaining a desired intensity profile (e.g., a "flat top" and/or circular beam). Based on the present disclosure, the person of ordinary skill in the art can use conventional optical simulation techniques to provide additional designs within the scope of the disclosure.

Advantageously, such systems can be provided in an all-fiber monolithic configuration using standard fusion splicing procedures and conventional commercial splicing equipment. Such an all-fiber approach can offer easy and simple handling, implementation and maintenance. As the person of ordinary skill in the art will appreciate, the optical fibers, methods and systems described herein do not require external elements, spatial filtering or special treatment to be operated and to perform mode up-conversion. The optical fibers described herein can be packaged into beam delivery cables and simply spliced to the output of the laser, and thus are compatible with existing optical fiber laser and amplifier systems. Similarly, the optical fibers described herein can be coupled to any system using optical radiation, for example through free-space optics, to the output of other types of lasers, such as solid-state lasers. And when used as mode mixing pump fibers or mode mixing active optical fibers, the fibers described herein can be coupled into amplifier and laser systems using conventional methodologies, e.g., fusion splicing and free space optics.

Figure 2:
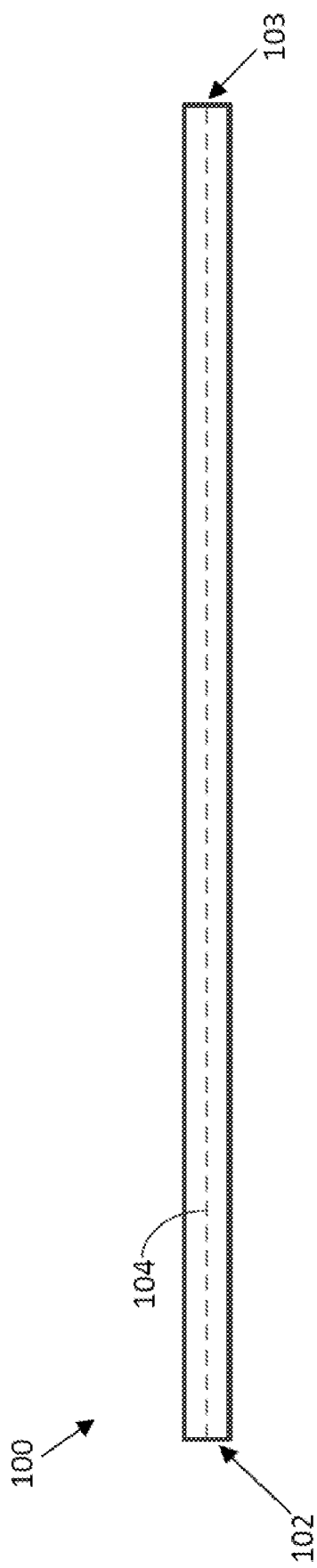
FIG. 2 is a schematic side view of a mode mixing optical fiber according to one embodiment of the disclosure.

An embodiment of the disclosure is shown in cross-sectional schematic view in FIG. 1, and in schematic side view in FIG. 2. Mode mixing optical fiber 100 has an input end 102 and an output end 103. Mode mixing optical fiber 100 also has a centerline 104 (defined as the point at the geometrical center of the cross-section of an optical fiber), and a refractive index profile (defined as the refractive index as a function of position of the cross-section of an optical fiber). The mode mixing optical fiber 100 includes a core, here, innermost core 110 (which has its own refractive index profile, defined as the refractive index as a function of position of the cross-section of the core of an optical fiber); and a cladding 120 disposed about the core. The mode mixing optical fiber is configured to deliver optical radiation having a wavelength (i.e., from its input end to its output end). Notably, the core of the mode mixing optical fiber supports at least two (e.g., at least three or at least five) guided modes (i.e., modes substantially confined by the core) at the wavelength. For example, in certain embodiments, the core of the mode mixing optical fiber supports at least seven guided modes at the wavelength, or at least ten modes at the wavelength. In other embodiments, the mode mixing optical fiber supports at least twenty, at least thirty, at least forty or even at least fifty modes at the wavelength. In certain desirable embodiments (e.g., for beam delivery applications, mode conversion applications, pump fiber applications and certain active fiber applications), it is the innermost core of the mode mixing optical fiber that supports at least the specified number of guided modes at the wavelength. But in other embodiments, e.g., dual-clad active optical fibers, a pump core is the mode mixing core and as such supports at least the specified number of guided modes at the wavelength.

Critically, the mode mixing optical fiber is configured to substantially distribute optical radiation having the wavelength propagating therein among a plurality of the guided modes of the mode mixing optical fiber. By substantially distributing optical radiation among a plurality of guided modes, the mode mixing optical fiber can guide radiation having a desired intensity profile within the optical fiber, and can provide an output having desired modal qualities, intensity profile (e.g., a relatively "flat-top" intensity profile), divergence, beam size and beam parameter product. In certain embodiments, the mode mixing optical fiber is configured to substantially distribute optical radiation such that at least 10%, at least 20%, at least 30%, at least 40% or even at least 50% of the optical radiation is guided in a mode other than the fundamental mode. For example, the mode mixing optical fiber can be configured to distribute optical radiation having the wavelength from being substantially guided in the fundamental mode (e.g., at least 70%, at least 80%, at least 90% or even at least 95% in the fundamental mode) to being substantially distributed among a plurality of guided modes (e.g., such that at least 10%, at least 20%, at least 30%, at least 40% or even at least 50% of the optical radiation is guided in a mode other than the fundamental mode). In certain embodiments, the mode mixing optical fiber is configured to substantially distribute optical radiation such that at least 10%, at least 20%, at least 30%, at least 40% or even at least 50% of the optical radiation is guided in a mode other than the fundamental mode or a first higher order mode (i.e., a mode that is a next higher mode compared to the fundamental mode, e.g., an $LP_{11}$ mode or an LP$_{02}$ mode). In certain embodiments, the mode mixing optical fiber is configured to substantially distribute optical radiation such that no more than 90%, no more than 80%, no more than 70%, no more than 60% or even no more than 50% of the optical radiation is guided in any two guided modes.

For example, in certain embodiments, the mode mixing optical fiber is configured to distribute a fraction of the optical radiation having the wavelength propagating therein (e.g., input at its input end or generated or amplified within the core) from its lower-order modes to its higher-order modes. Through the distribution of optical power among not only the low-order modes but also the higher-order modes of the mode mixing optical fiber, radiation can be transmitted in the fiber with a desired intensity profile (e.g., a relatively "flat-top" profile as described herein). Similarly, a beam can be output from the output end of the mode mixing optical fiber that has, for example, a desired BPP and/or beam shape, such as a relatively "flat-top" profile. Similarly, radiation can be guided within the mode mixing optical fiber with a desired intensity profile (e.g., a relatively "flat-top" profile as described herein).

Based on the present disclosure, the person of ordinary skill in the art can provide mode mixing optical fibers that guide light with a substantially flat-top intensity profile (i.e., within the fiber). For example, the mode mixing optical fiber can be configured to provide guided radiation (i.e., at the wavelength) having an intensity profile (i.e., as defined by an outer periphery at 5% of the peak intensity) having at least 70%, at least 80%, or even at least 90% of its cross-sectional area within about 20%, within about 15%, or even within about 10% of its average intensity.

Figure 3:
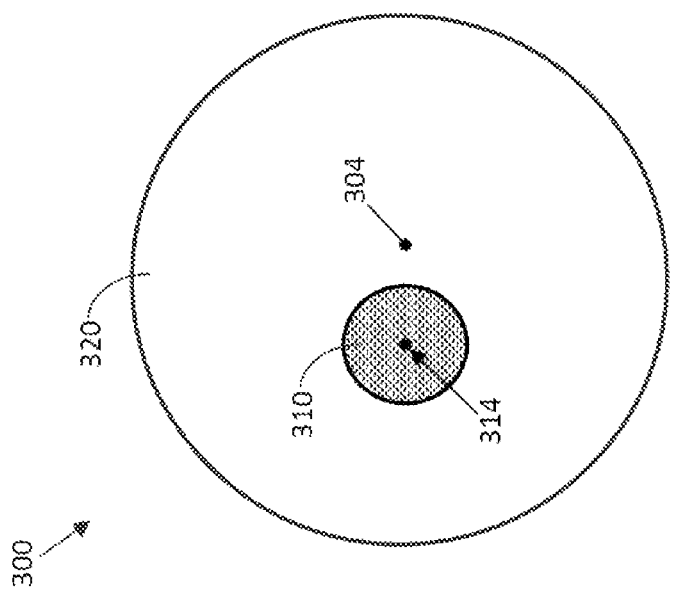
FIG. 3 is a cross-sectional schematic view of a mode mixing optical fiber according to another embodiment of the disclosure.

The present disclosure identifies a number of ways to configure a mode mixing optical fiber such that it distributes optical radiation generally as described above. For example, in certain embodiments of the disclosure, the core of the mode mixing optical fiber has a centerline (i.e., defined as described above, but with reference to the core as opposed to the overall fiber) that is positioned substantially non-collinearly with the centerline of the optical fiber. In other words, in certain embodiments, the core of the mode mixing optical fiber is disposed off-center with respect to the overall mode mixing optical fiber. FIG. 3 is a cross-sectional schematic view of a mode mixing optical fiber 300, which has an innermost core 310 and a cladding 320 disposed around the innermost core. In this embodiment, innermost core 310 has a centerline 314 that is disposed substantially off-center with respect to the overall fiber 300. That is, the center of the innermost core 310 is laterally offset from the centerline 304 of the overall fiber 300. In this embodiment, the mode mixing optical fiber has a step index profile; the person of ordinary skill in the art will appreciate that other index profiles may be used.

The person of ordinary skill in the art will appreciate that the core of the mode mixing optical fiber can take a variety of shapes. For example, in certain embodiments, as shown in FIG. 3, the core has a substantially circular cross-sectional shape. When the mode mixing optical fiber has a core that is substantially circular in cross-sectional shape, it desirably includes some other feature or characteristic that can provide for the desired distribution of radiation among modes. For example, it can have a laterally-offset core, as described above. In other embodiments, the core can have a refractive index profile configured to distribute radiation among modes, as described in more detail below.

Figure 4:
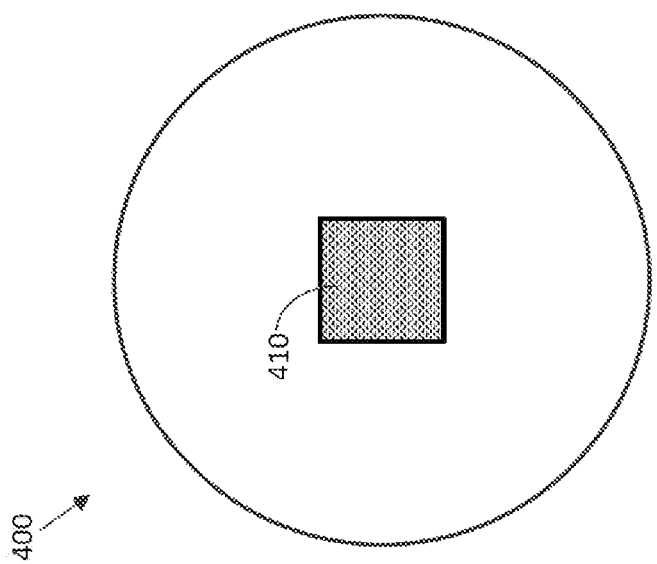
FIG. 4 is a cross-sectional schematic view of a mode mixing optical fiber according to another embodiment of the disclosure.

In other embodiments, the core of the mode mixing optical fiber has a substantially non-circular cross-sectional shape. For example, mode mixing optical fiber 400, shown in cross-sectional schematic view in FIG. 4, has a core 410 that has a substantially rectangular shape (here, a square). In certain embodiments, the substantially non-circular core is centered along the centerline of the mode mixing optical fiber (i.e., the core has a centerline that is positioned substantially collinear with the centerline of the optical fiber). A variety of other substantially non-circular shapes can be used for the core in such embodiments. For example, the core can have a polygonal shape (e.g., a regular polygon or an irregular polygon), with any desirable number of sides (e.g., triangular, rectangular, hexagonal). Of course, a substantially non-circular core need not be polygonal; it can have a rounded but non-circular shape (e.g., oval, elliptical, hemicircular, etc.).

In certain embodiments, the core of the mode mixing optical fiber has one or more substantially up-doped regions and/or one or more substantially down-doped regions, configured to provide the desired distribution of radiation among its propagating modes ("mode mixing elements"). As will be described in more detail below, the one or more mode mixing elements can be configured in a number of ways. The person of ordinary skill in the art will appreciate that the up-doped mode mixing elements are desirably not themselves sufficient to act as a guiding core for light of the wavelength. Any up-doped mode mixing elements are desirably not centered along the centerline of the core or the centerline of the optical fiber (although as described in detail below, in certain embodiments the mode mixing optical fiber can include a second core that is, e.g., disposed along the centerline of the mode mixing optical fiber).

Figure 5:
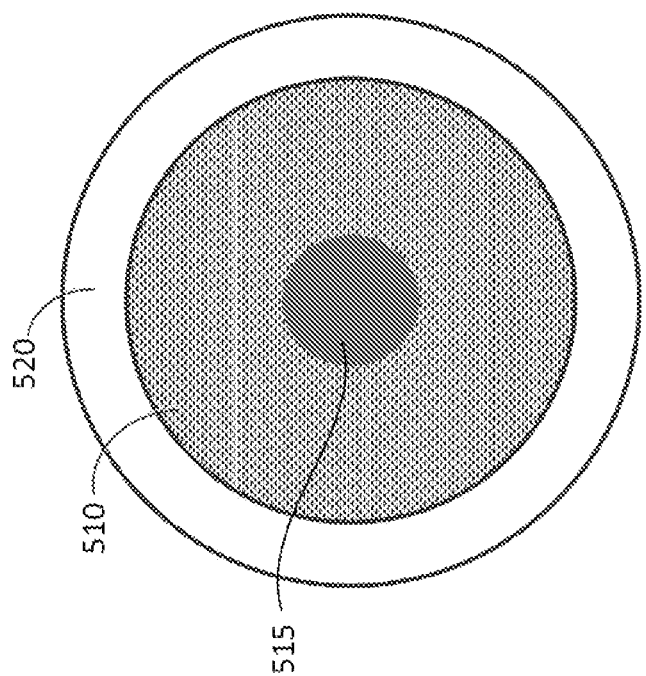
FIG. 5 is a cross-sectional schematic view of a mode mixing optical fiber according to another embodiment of the disclosure.

In certain embodiments, the core of the optical fiber includes one or more substantially down-doped mode mixing elements disposed symmetrically around its centerline. For example, the core of the mode mixing optical fiber can include a substantially down-doped mode mixing element having a centerline disposed substantially collinear with the centerline of the core. One such embodiment is shown in cross-sectional schematic view in FIG. 5. Mode mixing optical fiber 500 has a core 510 surrounded by a cladding 520. Core 510 includes a substantially down-doped mode mixing element 515, which has a centerline disposed along the centerline of the core itself.

In certain embodiments, the core of the mode mixing optical fiber includes one or more substantially down-doped mode mixing elements that are disposed asymmetrically around the centerline of the core. Such substantially down-doped mode mixing elements may be provided, for example, in combination with a down-doped mode mixing element provided along the centerline of the core as described above, or may be provided in the absence of a down-doped mode mixing element provided along the centerline of the core.

Figure 6:
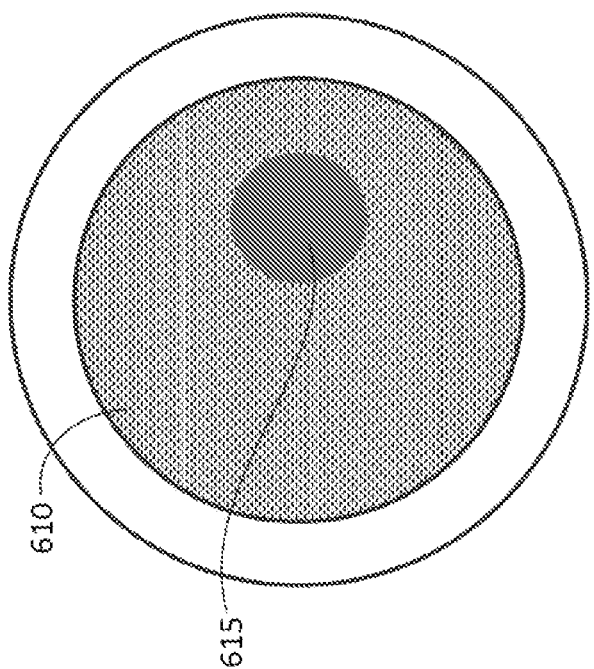
FIG. 6 is a cross-sectional schematic view of a mode mixing optical fiber according to another embodiment of the disclosure.
Figure 8:
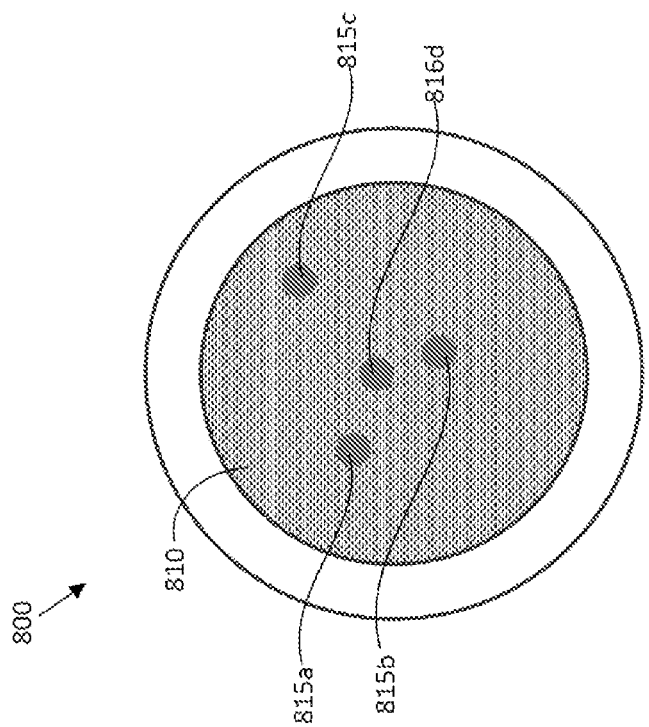
FIG. 8 is a cross-sectional schematic view of a mode mixing optical fiber according to another embodiment of the disclosure.
Figure 7:
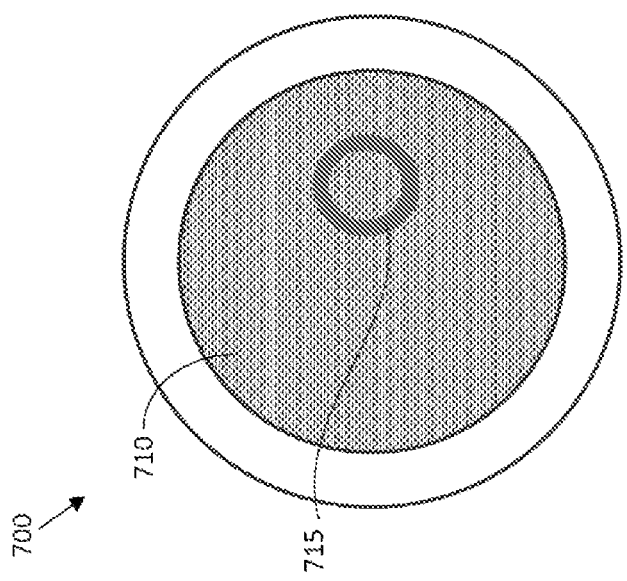
FIG. 7 is a cross-sectional schematic view of a mode mixing optical fiber according to another embodiment of the disclosure.

For example, optical fiber 600, shown in cross-sectional schematic view in FIG. 6, has a innermost core 610 that includes a substantially down-doped mode mixing element 615 disposed offset from the centerline of the innermost core of the optical fiber (in this embodiment, also disposed offset from the centerline of the optical fiber itself). As another embodiment, FIG. 7 is a cross-sectional schematic view of a mode mixing optical fiber. The mode mixing optical fiber 700 includes an innermost core 710, which includes a down-doped ring-shaped mode mixing element 715; here, too, the down-doped mode mixing element is disposed with its center offset from the center of the innermost core (and also the centerline of the fiber). FIG. 8 is a cross-sectional schematic view of yet another embodiment of a mode mixing optical fiber as described herein. Referring to FIG. 8, mode mixing optical fiber 800 includes an innermost core 810, which includes down-doped mode mixing elements 815a, 815b, 815c and 815d. Here, the down-doped mode mixing elements 815a, 815b, 815c and 815d are disposed with their centers at various distances away from the centerline 804 of the optical fiber. When multiple down-doped mode mixing elements are provided, they may be disposed randomly, or alternatively, arranged in a regular geometrical arrangement.

In certain embodiments, the innermost core of a mode mixing optical fiber includes one or more substantially up-doped mode mixing elements. For example, the one or more substantially up-doped mode mixing elements may be disposed asymmetrically around the centerline of the innermost core, e.g., in any of the manners described above with respect to the down-doped mode mixing elements. In other embodiments, an up-doped mode mixing element is disposed symmetrically around the center of the innermost core (e.g., as a ring-shaped region), but substantially towards the periphery of the innermost core (e.g., with at least ½, ⅔ or even ¾ of the area of the high index area disposed at least half the radius of the innermost core away from the centerline of the innermost core. If present, the one or more high-index mode mixing elements can be provided in combination with one or more low-index mode mixing elements as described above.

Up- and down-doped mode mixing elements are desirably offset from the center of the core of the optical fiber. For example, in certain embodiments as otherwise described herein, one or more (e.g., all) of the up- and down-doped mode mixing elements are offset from the geometrical center of the core of by at least 1 µm, at least 5 µm, at least 10 µm, or at least 15 µm. In certain such embodiments, one or more (e.g., all) of the up- and down-doped mode mixing elements are offset from the geometrical center of the core by a distance in the range of 1 µm-100 µm, or 5 µm-100 µm, or 10 µm-100 µm, or 15 µm-100 µm, or 1 µm-75 µm, or 5 µm-75 µm, or 10 µm-75 µm, or 15 µm-75 µm, or 1 µm-40 µm, or 5 µm-40 µm, or 10 µm-40 µm, or 15 µm-40 µm, or 1 µm-25 µm, or 5 µm-25 µm, or 10 µm-35 µm.

In certain embodiments as otherwise described herein, the mode mixing optical fiber includes as a down-doped mode mixing element an annular shape (e.g., a ring), e.g., as shown in the optical fibers of the Examples. The annulus can have an average inner diameter in the range of, for example, 5 µm-100 µm, or 10 µm-100 µm, or 20 µm-100 µm, or 5 µm-80 µm, or 10 µm-80 µm, or 20 µm-80 µm, or 5 µm-60 µm, or 10 µm-60 µm, or 20 µm-60 µm, or 5 µm-40 µm, or 10 µm-40 µm, or 20 µm-40 µm. The annulus can have a thickness in the range of, for example, 1 µm-20 µm, or 2 µm-20 µm, or 3 µm-20 µm, or 4 µm-20 µm, or 1 µm-10 µm, or 2 µm-10 µm, or 3 µm-10 µm, or 4 µm-10 µm, or 1 µm-5 µm, or 2 µm-6 µm, or 3 µm-7 µm, or 4 µm-8 µm.

The core of the mode mixing optical fiber can be formed in a variety of sizes. For example, in certain embodiments, the core of the optical fiber has a diameter (i.e., the radially-averaged distance across the core) in the range of about 50 µm to about 3000 µm, e.g., in the range of about 50 µm to about 2000 µm, or about 50 µm to about 1000 µm, or about 50 µm to about 600 µm, or about 100 µm to about 3000 µm, or about 100 µm to about 2000 µm, or about 100 µm to about 1000 µm, or about 100 µm to about 600 µm, or about 200 µm to about 3000 µm, or about 200 µm to about 2000 µm, or about 200 µm to about 1000 µm, or about 200 µm to about 600 µm. The person of ordinary skill in the art will select a core diameter to provide a desired number of modes and overlap with an input optical fiber or other optical source (e.g., a solid state laser).

Similarly, the overall mode mixing optical fiber may be formed in a variety of sizes. In certain embodiments, the mode mixing optical has an outer diameter in the range of about 100 µm to about 3600 µm, e.g., in the range of about 100 µm to about 3000 µm, or about 100 µm to about 2500 µm, or about 100 µm to about 1500 µm, or about 100 µm to about 1000 µm, or about 100 µm to about 800 µm, or about 100 µm to about 600 µm, or about 200 µm to about 3600 µm, or about 200 µm to about 3000 µm, or about 200 µm to about 2500 µm, or about 200 µm to about 1500 µm, or about 200 µm to about 1000 µm, or about 200 µm to about 800 µm, or about 200 µm to about 600 µm. In certain embodiments, the outer diameter of the mode mixing optical fiber is at least about 1.05 times the outer diameter of the core, for example, in the range of about 1.05 to about 5 times, or about 1.05 to about 3 times, or about 1.05 to about 2 times the outer diameter of the core of the mode mixing optical fiber. For example, in some embodiments, the outer diameter of the mode mixing optical fiber is at least about 1.2 times the outer diameter of the core, for example, in the range of about 1.2 to about 5 times, or about 1.2 to about 3 times, or about 1.2 to about 2 times the outer diameter of the core of the mode mixing optical fiber.

As the person of ordinary skill in the art will appreciate, the various up-doped and down-doped mode mixing elements may be provided in a variety of shapes and a variety of sizes. In certain embodiments, the various up-doped and/or down-doped mode mixing elements have a cross-sectional shape selected from circular, polygonal (e.g., triangular, hexagonal, square). The various up-doped and/or down-doped mode mixing elements can be provided as annular shapes (e.g., circular rings, or annular polygons). The various up-doped and/or down-doped mode mixing elements can be, for example, at least about the size of the wavelength (i.e., in radially-averaged cross-sectional width). In certain embodiments, the various up-doped and/or down-doped mode mixing elements are, for example in the range of about 1 µm to about 2000 µm in size, e.g., in the range of about 1 µm to about 1500 µm, or about 1 µm to about 1000 µm, or about 1 µm to about 800 µm, or about 1 µm to about 600 µm, or about 1 µm to about 400 µm, or about 1 µm to about 200 µm, or about 1 µm to about 100 µm, or about 1 µm to about 50 µm, or about 1 µm to about 30 µm, or about 1 µm to about 20 µm, or about 1 µm to about 15 µm, or about 2 µm to about 2000 µm, or about 2 µm to about 1500 µm, or about 2 µm to about 1000 µm, or about 2 µm to about 800 µm, or about 2 µm to about 600 µm, or about 2 µm to about 400 µm, or about 2 µm to about 200 µm, or about 2 µm to about 100 µm, or about 2 µm to about 50 µm, or about 2 µm to about 30 µm, or about 2 µm to about 20 µm, or about 2 µm to about 15 µm, or about 5 µm to about 2000 µm, or about 5 µm to about 1500 µm, or about 5 µm to about 1000 µm, or about 5 µm to about 800 µm, or about 5 µm to about 600 µm, or about 5 µm to about 400 µm, or about 5 µm to about 200 µm, or about 5 µm to about 100 µm, or about 5 µm to about 50 µm, or about 5 µm to about 30 µm, or about 5 µm to about 20 µm, or about 5 µm to about 15 µm, or about 15 µm to about 2000 µm, or about 15 µm to about 1500 µm, or about 15 µm to about 1000 µm, or about 15 µm to about 800 µm, or about 15 µm to about 600 µm, or about 15 µm to about 400 µm, or about 15 µm to about 200 µm. In certain embodiments, the total percentage of core area of the up- and/or down-doped regions is in the range of about 5% to about 95%, e.g., in the range of about 2% to about 85%, or about 2% to about 75%, or about 2% to about 50%, or about 2% to about 25%, about 5% to about 85%, or about 5% to about 75%, or about 5% to about 50%, or about 5% to about 25%, or about 10% to about 95%, or about 10% to about 85%, or about 10% to about 75%, or about 10% to about 50%, or about 10% to about 25%.

The one or more substantially up-doped and/or down-doped mode mixing elements have a refractive index that is substantially different from that of the remainder of the core. For example, in certain embodiments each substantially up-doped mode mixing element can have a refractive index (i.e., at the wavelength) that is, for example, at least about 0.001, at least about 0.002, at least about 0.003, or even at least about 0.005 greater than that of the remainder of the core. In certain embodiments, each substantially up-doped mode mixing element has a refractive index that is less than about 0.050, less than about 0.040, less than about 0.030 or less than about 0.020 greater than that of the remainder of the core. For example, in certain embodiments, each substantially up-doped mode mixing element has a refractive index that is in the range of 0.001-0.050, or 0.001-0.040, or 0.001-0.030, or 0.001-0.020, or 0.002-0.050, or 0.002-0.040, or 0.002-0.030, or 0.002-0.020, or 0.003-0.050, or 0.003-0.040, or 0.003-0.030, or 0.003-0.020, or 0.005-0.050, or 0.005-0.040, or 0.005-0.030, or 0.005-0.020 greater than that of the remainder of the core. Similarly, in certain embodiments the substantially down-doped regions can have a refractive index that is, for example, at least about 0.0005, at least about 0.001, at least about 0.002, at least about 0.003, or even at least about 0.005 less than that of the remainder of the core. In certain embodiments, each substantially down-doped region has a refractive index that is less than about 0.050, less than about 0.040, less than about 0.030 or less than about 0.020 less than that of the remainder of the core. For example, in certain embodiments, each substantially down-doped region has a refractive index that is in the range of 0.001-0.050, or 0.001-0.040, or 0.001-0.030, or 0.001-0.020, or 0.002-0.050, or 0.002-0.040, or 0.002-0.030, or 0.002-0.020, or 0.003-0.050, or 0.003-0.040, or 0.003-0.030, or 0.003-0.020, or 0.005-0.050, or 0.005-0.040, or 0.005-0.030, or 0.005-0.020 less than that of the remainder of the core. In certain desirable embodiments, the substantially up-doped and/or down-doped regions are formed as regions of index discontinuity within the core (i.e., with the change in refractive index occurring within about 1 μm in linear distance along the cross-section of the core).

In certain embodiments, the mode mixing optical fiber can be configured as a mode mixing active optical fiber. The person of ordinary skill in the art will appreciate that an "active optical fiber" is an optical fiber that is configured (e.g., by the inclusion of rare earth dopants) to emit amplified radiation at the wavelength of operation when pumped with radiation (e.g., of a shorter wavelength). For example, in certain embodiments, the large mode area optical fiber can include a rare earth dopant in the core thereof. Rare earth dopants that can be suitable in certain embodiments include elements 57-71 of the periodic table (e.g., lanthanum, cerium, praseodymium, neodymium, promethium, samarium, europium, gadolinium, terbium, dysprosium, holmium, erbium, thulium, ytterbium, and lutetium). Responsive to receiving energy of a wavelength, known in the art as the "pump" wavelength, certain rare earths can provide optical energy of a different, "active" wavelength via stimulated emission. Emission can be stimulated by radiation that is guided by the core (e.g., from a signal source such as a seed laser), or simply by radiation at an active wavelength that is spontaneously emitted by the active optical fiber. Optical fibers doped with a rare earth can thus be used as light sources, such as for example, super luminescent light sources and lasers that provide light at the second wavelength. Often the light at the second wavelength is of higher quality in terms of divergence, spatial and temporal coherence and the like. In many applications a fiber comprising a rare earth dopant thus acts as a brightness converter that receives low quality light beam and converts that light to higher quality light at a more desirable wavelength. Fibers doped with rare earth dopants (i.e., in ionic form as, e.g., oxides, hydroxides, or as other species depending on the material composition of the fiber) can also be used as amplifiers that amplify a signal of the other wavelength propagated by the fiber. As an alternative, the person of ordinary skill in the art will appreciate that other gain mechanisms can be exploited by the active optical fiber, e.g., Raman scattering, Brillouin scattering. A mode mixing active optical fiber can have, for example, a core that is configured both with an active core (e.g., by being doped with one or more rare earths as described above) and with mode mixing elements included as described in the above. In such embodiments, the optical radiation generated at the active wavelength can be distributed into higher-order modes, and thus be provided with a desired intensity profile as it is guided within the fiber and as it is coupled out of the fiber.

Figure 9:
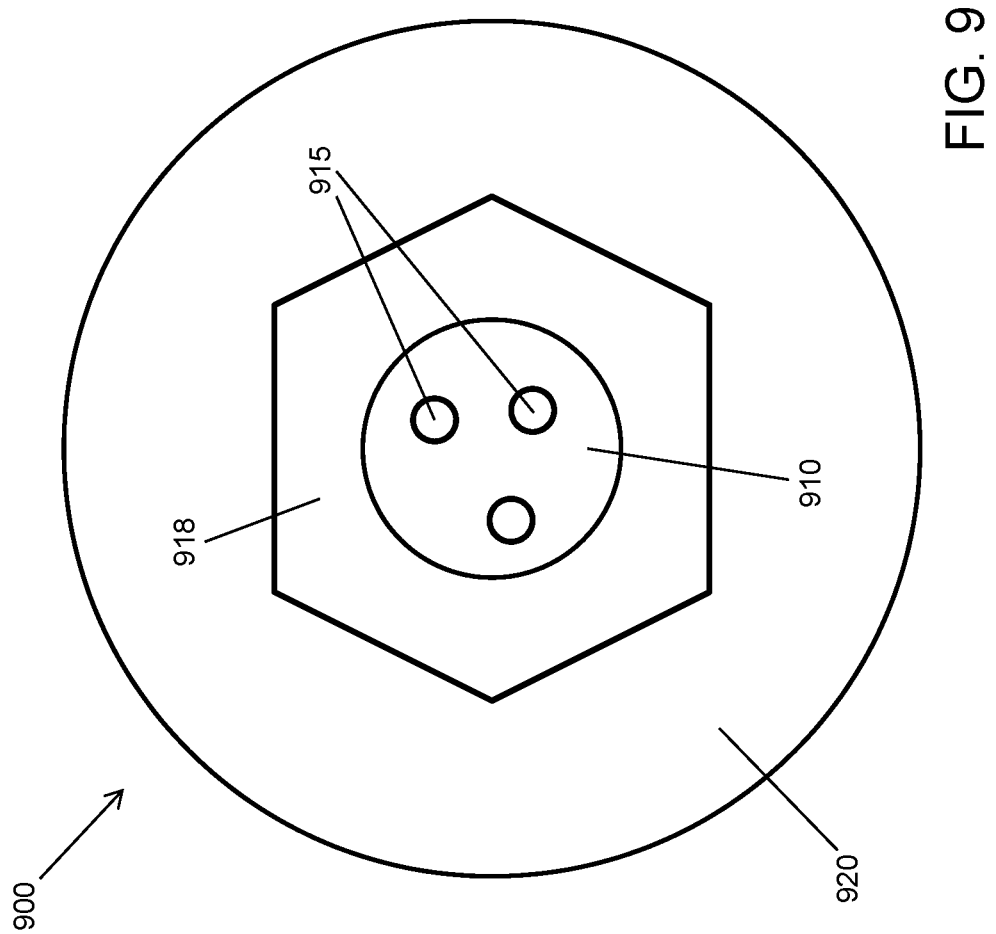
FIG. 9 is a schematic cross-sectional view of a mode mixing optical fiber according to another embodiment of the disclosure.

A mode mixing active optical fiber can be configured as a multi-clad (e.g., dual-clad) fiber. As the person of ordinary skill in the art will appreciate, a multi-clad active optical fiber can have an inner core configured to guide radiation of the active wavelength, a pump core surrounding the inner core and configured to guide radiation of the pump wavelength, and one or more claddings surrounding the pump core. An example of such a mode mixing active optical fiber is shown in schematic cross-sectional view in FIG. 9. Mode mixing active optical fiber 900 has a multimode core 910 which includes up-doped mode mixing elements as described above, and is also configured to provide gain when pumped (e.g., by including one or more rare earth dopants). Thus, the core 910 of mode mixing active optical fiber supports at least two (e.g., at least three, at least five, or any other number as described above) guided modes at the active wavelength, and is configured to substantially distribute the optical radiation having the wavelength among a plurality of the guided modes of the active mode mixing optical fiber (e.g., to distribute a substantial fraction of the optical radiation having the wavelength from its lower-order modes to its higher-order modes), in any manner as described herein. Mode mixing active optical fiber 900 also includes a pump core 918, here shaped as a hexagon. The pump core acts as a cladding layer for the core 910 (and thus would also be recognized by the person of skill in the art as a "pump cladding") but also acts to guide radiation of the pump wavelength. Cladding 920 acts to confine radiation of the pump wavelength in the pump core, and can be formed, for example, from a layer of glass or from a polymer coating of the optical fiber. The active optical fiber can be spun during fabrication, so that the mode-mixing elements 915 and hexagonal-shaped pump core 918 trace out helices along the length of the optical fiber. In certain embodiments, both the active core (910 in FIG. 9) and the pump core (918 in FIG. 9) can provide mode mixing—the active core for radiation of the active wavelength, and the pump core for radiation of the pump wavelength. The person of ordinary skill in the art will appreciate that any of the mode mixing architectures can be used in providing the mode mixing active fiber as described above; the disclosure is not limited to the combination of a shaped pump core and an active core including up-doped elements as depicted in FIG. 9. Use of mode mixing in the active core can be useful, for example, in providing gain redistribution among the modes of a multi-mode active core (including two- or few-moded active cores), such that a substantial fraction of the modes are amplified and amplification is substantially distributed among a plurality of guided modes. This can be useful, for example, to allow a high degree of scaling of power, shorter fiber length for single-frequency lasers, and the provision of random lasers, speckle-free systems and high stability multimode lasers, as well as providing for a desired intensity profile (e.g., "flat-top") as described above. Mode mixing in the pump core is described in more detail below.

Figure 10:
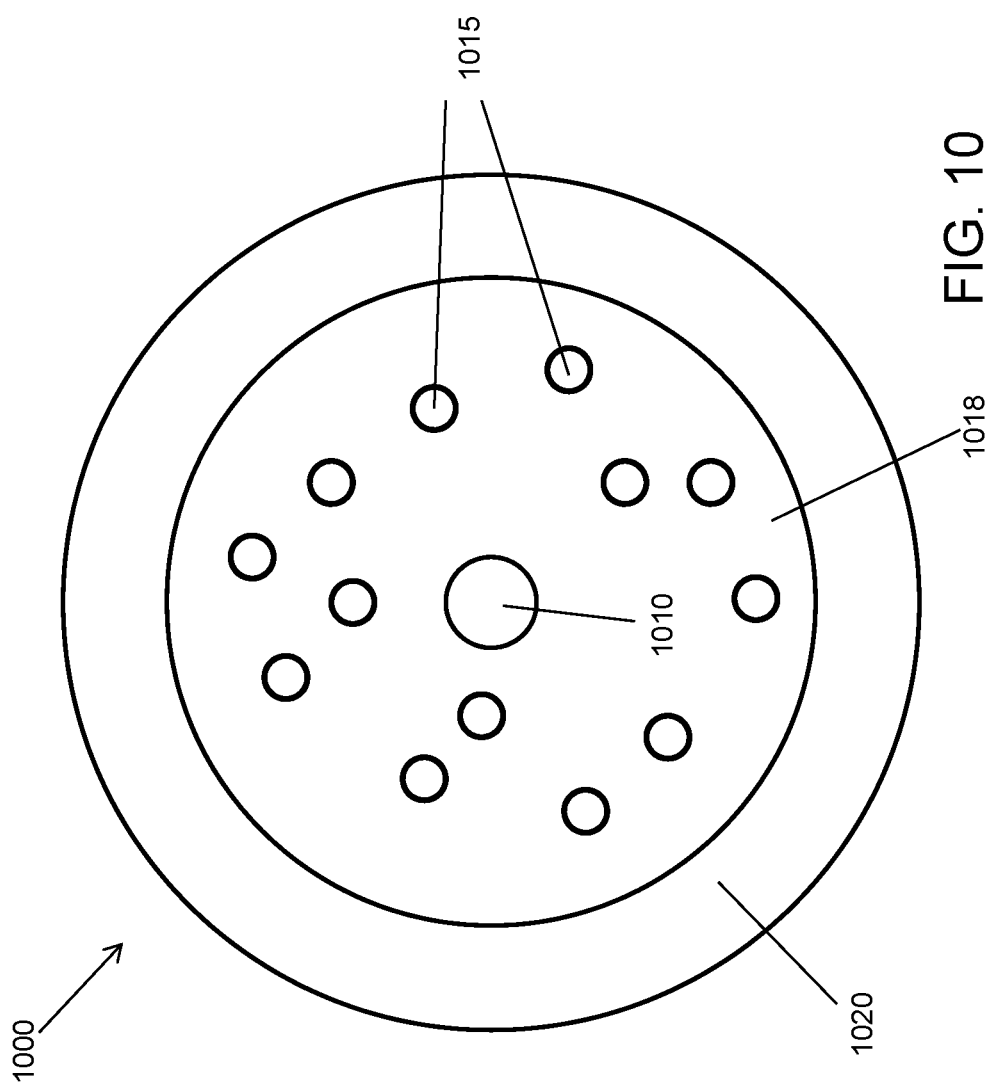
FIG. 10 is a schematic cross-sectional view of a mode mixing optical fiber according to another embodiment of the disclosure.

As noted above, in certain embodiments the mode mixing optical fiber can include a second core that is disposed, e.g., along the centerline of the mode mixing optical fiber. For example, the mode mixing optical fiber can have a second core disposed within the (mode mixing) core, for example, along the centerline of the optical fiber. In certain such embodiments, the mode mixing optical fiber can be configured as a multi-clad fiber, with the mode mixing core being configured as a pump core, and a second core disposed within the mode mixing core, with the mode mixing core acting as a cladding for the second core. For example, the second core can be configured as a passive core (i.e., not providing optical gain) guide radiation of an active wavelength of an amplifier or laser system. An example of such a mode mixing optical fiber is shown in schematic cross-sectional view in FIG. 10. Mode mixing dual clad optical fiber 1000 has a core 1010 disposed along the centerline of the fiber; it can be configured to pass through optical radiation of an active wavelength of a larger amplifier or laser system. Core 1010 can be single mode or multimode, depending on the particular requirements of the larger amplifier or laser system. Mode mixing dual-clad optical fiber 1000 also includes a pump core 1018, here, having up- and/or down-doped mode mixing elements 1015. As in the embodiment of FIG. 9, the pump core acts as a cladding layer for the core 1010 (and thus would be recognized by the person of skill in the art as a "pump cladding") but also acts to guide radiation of the pump wavelength associated with the active wavelength for which the core is configured to be guiding. Cladding 1020 acts to confine radiation of the pump wavelength in the pump core, and can be formed, for example, from a layer of glass or from a polymer coating of the optical fiber. The active optical fiber can be rotated during drawing, so that the regions 1015 trace out helices along the length of the optical fiber; the desired pitch of the helix is can be, for example, selected to provide destructive multimode interference for radiation of the wavelength. The person of ordinary skill in the art will appreciate that the mode mixing elements in the pump core can not only provide for mode mixing While the mode mixing optical fiber of FIG. 10 is described as having a passive core, in other embodiments a multi-clad optical fiber has an active core and one or more mode mixing elements disposed in one or more pump core layers disposed about the active core.

Figure 11:
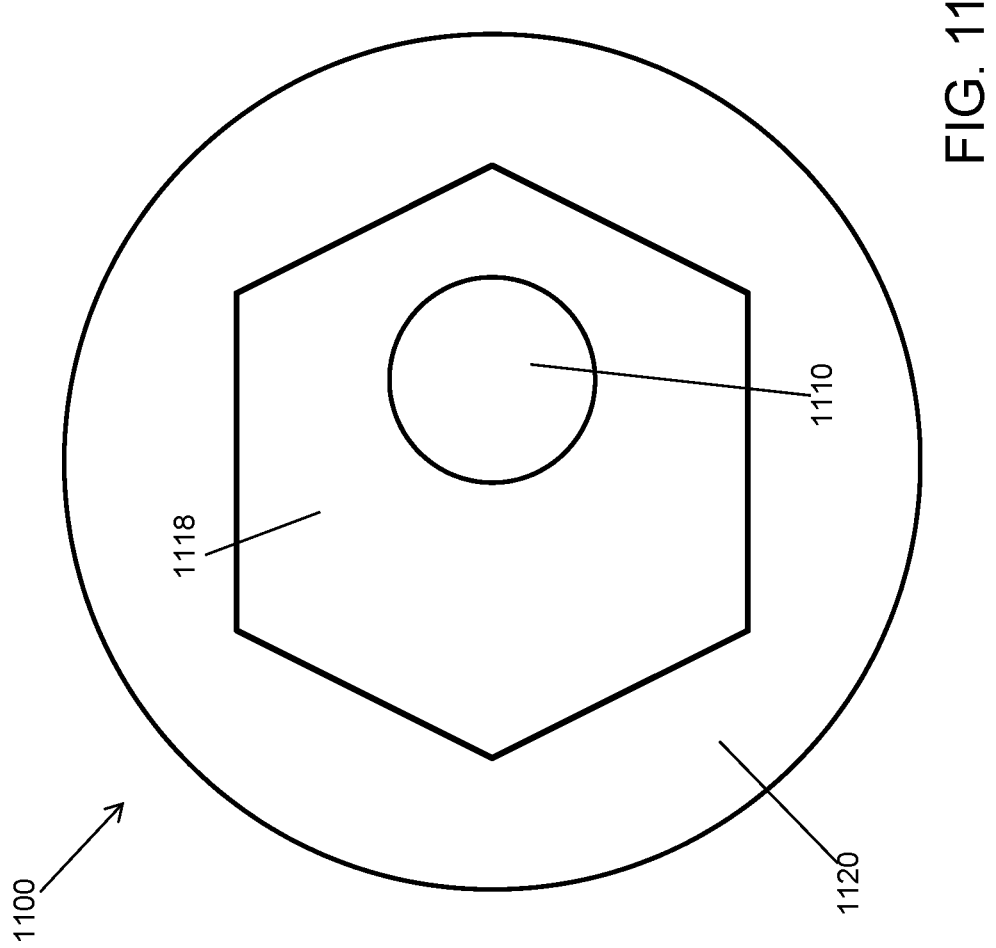
FIG. 11 is a schematic cross-sectional view of a mode mixing optical fiber according to another embodiment of the disclosure.

In other embodiments, the mode mixing core of a multi-clad fiber is a passive core configured, for example, to guide radiation of an active wavelength of a larger amplifier or laser system. An example of such a mode mixing active optical fiber is shown in schematic cross-sectional view in FIG. 11. Mode mixing active optical fiber 1100 has a multimode core 1110 which is offset from the centerline of the fiber as described above. The optical fiber can be rotated during drawing, so that the core 1110 traces out a helix along the length of the optical fiber. The core 1110 of mode mixing active optical fiber supports at least two (e.g., at least three or at least five, or any other number described above) guided modes at the wavelength, and is configured to distribute a fraction of the optical radiation having the wavelength propagating therein (e.g., an active wavelength of an amplifier or laser system) from its lower-order guided modes to its higher-order guided modes, as described above. Mode mixing active optical fiber 1100 also includes a pump core 1118, here shaped as a hexagon. As in the embodiment of FIG. 9, the pump core acts as a cladding layer for the core 1110 (and thus would be recognized by the person of skill in the art as a "pump cladding") but also acts to guide radiation of the pump wavelength. Cladding 1120 acts to confine radiation of the pump wavelength in the pump core, and can be formed, for example, from a layer of glass or from a polymer coating of the optical fiber. In certain embodiments, both the passive core (1110 in FIG. 11) and the pump core (1118 in FIG. 11) can provide mode mixing—the core for radiation of the active wavelength, and the pump core for radiation of the pump wavelength. The person of ordinary skill in the art will appreciate that any of the mode mixing architectures can be used in providing the mode mixing active fiber as described above; the disclosure is not limited to the combination of a shaped pump core and an active core including up-doped elements as depicted in FIG. 11. Use of mode mixing in the passive core can be useful, for example, in providing gain redistribution among the modes of a multimode core (including few-moded active cores), such that seed laser radiation can be provided to a multimode active optical fiber in a variety of its modes such that a substantial fraction of the modes are amplified and amplification is substantially distributed among the modes (e.g., substantially uniform among all modes). This can be thought of, for example, as increasing the numerical aperture of the seed source so that it can fill more of the modes of a multimode active optical power. This can be useful, for example, to allow a high degree of scaling of power, shorter fiber length for single-frequency lasers, and the provision of random lasers, speckle-free systems and high stability multimode lasers, as well as providing for a desired intensity profile (e.g., "flat-top") as described above.

The mode mixing optical fiber can be provided in a variety of lengths. The person of ordinary skill in the art can select a length sufficient to provide the desired distribution of radiation among the guided modes of the mode mixing optical fiber (e.g., in any manner described above). For example, in certain embodiments, the mode mixing optical fiber has a length in the range of about 1 m to about 100 m, e.g., in the range of about 1 m to about 50 m, or about 1 m to about 40 m, or about 1 m to about 50 m, or about 1 m to about 20 m, or about 1 m to about 10 m, or about 1 m to about 5 m, or about 5 m to about 100 m, or about 5 m to about 100 m, or about 5 m to about 50 m, or about 5 m to about 40 m, or about 5 m to about 50 m, or about 5 m to about 20 m, or about 10 m to about 100 m, or about 10 m to about 50 m, or about 10 m to about 40 m. A mode mixing optical fiber as described herein can be bent or even coiled to more efficiently distribute radiation among guided modes.

Figure 12:
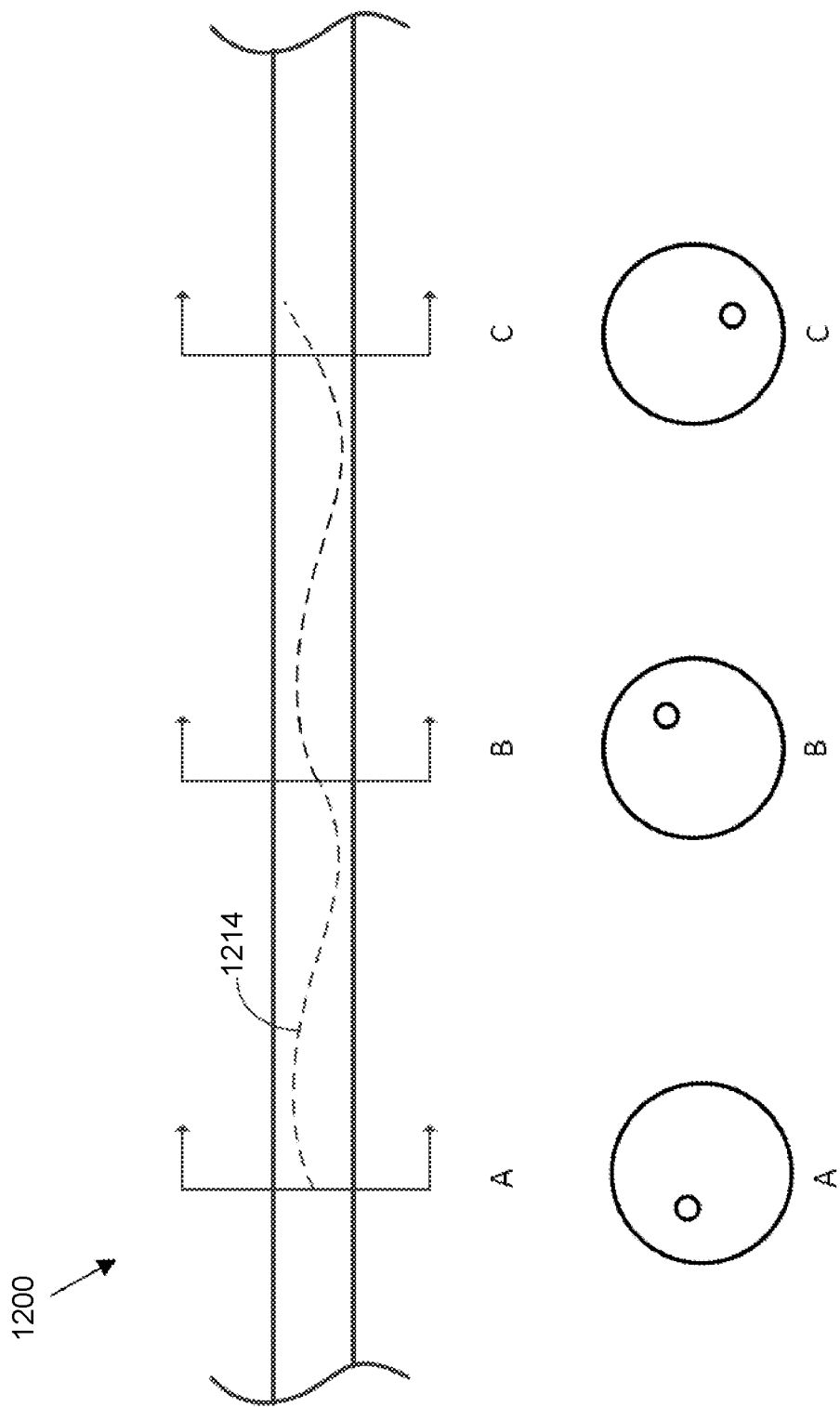
FIG. 12 is a schematic side view and a set of schematic cross-sectional views of a mode mixing optical fiber according to one embodiment of the disclosure.

In certain embodiments (including the embodiments of FIGS. 3, 4 and 6-8 as described above), the mode mixing optical fiber does not have a circularly-symmetric cross-sectional profile. In certain such embodiments, the cross-sectional profile of the mode mixing optical fiber is formed as a helix along the length hereof. That is, in a state that is not twisted by some external force, the various elements of the optical fiber twist in a helical configuration along the length of the fiber, for example, with a pitch in the range of about 1 mm to about 100 cm, e.g., in the range of about 1 mm to about 50 cm, or about 1 mm to about 30 cm, or about 1 mm to about 20 cm, or about 1 mm to about 10 cm, or about 1 mm to about 5 cm, or about 2 mm to about 100 cm, or about 2 mm to about 50 cm, or about 2 mm to about 30 cm, or about 2 mm to about 20 cm, or about 2 mm to about 10 cm, or about 2 mm to about 5 cm, or about 5 mm to about 100 cm, or about 5 mm to about 50 cm, or about 5 mm to about 30 cm, or about 5 mm to about 20 cm, or about 5 mm to about 10 cm, or about 5 mm to about 5 cm, or about 1 cm to about 100 cm, or about 1 cm to about 50 cm, or about 1 cm to about 30 cm, or about 1 cm to about 20 cm, or about 1 cm to about 10 cm, or about 1 cm to about 5 cm. Such a configuration is shown in schematic view in FIG. 12. A section of optical fiber 900 having an off-center innermost core is shown in side view, with the centerline 1214 of the innermost core shown as a dashed line. The cross-sectional profile at each of positions A, B and C is shown. Notably, the off-center innermost core is formed as a helix throughout the fiber. As the person of ordinary skill in the art will appreciate, any mode mixing elements that are not circularly symmetric with respect to the optical fiber would likewise trace out helices along the length of the fiber. The efficiency of the mode mixing process can be significantly increased by use of such a helical configuration. Such a fiber may be made using conventional methodologies (e.g., by rotating the preform during the draw of the optical fiber).

The mode mixing optical fiber can be made from conventional material using conventional methods in the art. For example, the optical fiber can be made using various silica-based glasses (e.g., silicates such as germanosilicates, borosilicates, phosphosilicates aluminosilicates, fluorosilicates and combinations thereof). In certain embodiments, the core (e.g., exclusive of any up-doped or down-doped regions) is formed from substantially undoped silica, while the cladding (at least in the region immediately surrounding the core) includes fluorine-doped silica. In other embodiments, the core (e.g., exclusive of any down-doped regions) is formed from germanium-doped silica, while the cladding (at least in the region immediately surrounding the core) includes substantially undoped silica. Conventional dopants, e.g., germanium, fluorine, aluminum, phosphorus, boron, can be used to provide up-doped and down-doped regions. Conventional methods of making optical fibers (e.g., stacking together various rods and tubes of different refractive indices, followed by collapsing them to a preform and drawing the preform) can be used to make the mode mixing optical fibers described herein. Desirably, the optical fibers described herein do not include void space. In certain desirable embodiments, the mode mixing elements do not form a substantially regular lattice.

Based on the present disclosure, the person of ordinary skill in the art can provide mode mixing optical fibers providing a wide variety of beam parameter products, and thus a wide variety of divergence angles. For example, in certain embodiments, the beam divergence of the mode mixing optical fiber is in the range of about 40 mrad, 60 mrad or 80 mrad up to the numerical aperture of the optical fiber, e.g., in the range of about 40 mrad to about 600 mrad, or about 40 mrad to about 300 mrad, or about 40 mrad to about 160 mrad, or about 40 mrad to about 140 mrad, or about 40 mrad to about 120 mrad, or about 40 mrad to about 100 mrad, or about 40 mrad to about 80 mrad, or about 60 mrad to about 600 mrad, or about 60 mrad to about 300 mrad, or about 60 mrad to about 160 mrad, or about 60 mrad to about 140 mrad, or about 60 mrad to about 120 mrad, or about 60 mrad to about 100 mrad, or about 60 mrad to about 80 mrad, or about 80 mrad to about 600 mrad, or about 80 mrad to about 300 mrad, or about 80 mrad to about 160 mrad, or about 80 mrad to about 140 mrad, or about 80 mrad to about 120 mrad, or about 80 mrad to about 100 mrad, or about 100 mrad to about 200 mrad, or about 100 mrad to about 400 mrad, or about 100 mrad to about 600 mrad, or about 200 mrad to about 600 mrad. Of course, the person of ordinary skill in the art can provide mode mixing optical fibers having different divergence angles for different applications. For example, the person of ordinary skill in the art, in some embodiments, can provide mode mixing optical fibers with beam divergence angles as high as the NA of the core.

Similarly, based on the present disclosure, the person of ordinary skill in the art can provide mode mixing optical fibers providing a substantially flat-top output. For example, the mode mixing optical fiber can be configured to output a beam (i.e., as defined by an outer periphery at 5% of the peak intensity) having at least 70%, at least 80%, or even at least 90% of its cross-sectional area within about 20%, within about 15%, or even within about 10% of its average intensity.

Based on the present disclosure, the person of ordinary skill in the art can provide mode mixing optical fibers that guide light with a substantially flat-top intensity profile (i.e., within the fiber). For example, the mode mixing optical fiber can be configured to provide guided radiation (i.e., at the wavelength) having an intensity profile (i.e., as defined by an outer periphery at 5% of the peak intensity) having at least 70%, at least 80%, or even at least 90% of its cross-sectional area within about 20%, within about 15%, or even within about 10% of its average intensity.

The mode mixing optical fibers can be provided with a variety of numerical aperture values. For example, in certain embodiments, the numerical aperture of a mode mixing optical fiber is in the range of about 0.10 to about 0.60, e.g., in the range of about 0.10 to about 0.40 or about 0.10 to about 0.30, or about 0.10 to about 0.22, or about 0.15 to about 0.60, or about 0.15 to about 0.40, or about 0.15 to about 0.30.

The various regions of the refractive index profile of the core can perturb the propagation of radiation therein, e.g., by acting as a scattering (or weakly guiding) center, reflecting (or guiding) the light to populate the higher order modes of the core. As the person of ordinary skill in the art will appreciate based on the present disclosure, the performance of the mode mixing optical fibers described herein may be influenced by several design parameters including, for example, the lateral offset of the core, the refractive index profile of the core, the numerical aperture, the length of the mode mixing fiber, any coiling conditions (diameter and length), and any helicity of the refractive index profile of the core. In view of the present disclosure, the person of ordinary skill in the art will be able to arrive at additional designs using conventional computational techniques. The design of the mode mixing optical fiber may be scaled in order to provide a desired core size (e.g., to match the size of a separate beam delivery fiber when one is used.

Another aspect of the disclosure is an optical system that includes a mode mixing optical fiber as described above, and a first optical fiber having an output end directly optically coupled to the input end of the mode mixing optical fiber, the first optical fiber being configured to propagate optical radiation having the wavelength. One such embodiment is shown in partial schematic side view in FIG. 13. Optical system 1330 includes a mode mixing optical fiber 1300, having an input end 1302 and an output end 1304, as well as a first optical fiber 1340, having an output end 1344. The output end 1344 of the first optical fiber is directly optically coupled to the input end 1302 of the mode mixing optical fiber (i.e., without any substantial optical component therebetween). For example, the output end of the first optical fiber can be fusion spliced to the input end of the mode mixing optical fiber. The first optical fiber can couple light radiation to the input end of the mode mixing optical fiber such that their centerlines are aligned with one another (i.e., even though the core of the mode mixing optical fiber may be offset from the centerline of the mode mixing optical fiber).

Notably, the mode mixing optical fiber can accept radiation from a single or few-moded optical fiber and, through distribution of radiation into higher order modes, provide an output beam having desired optical characteristics (e.g., as described above). Thus, in certain embodiments, the first optical fiber is single-mode at the wavelength. In other embodiments, the first optical fiber has 7 or fewer, 6 or fewer, 5 or fewer or even 4 or fewer modes at the wavelength. Of course, in other embodiments, the mode mixing fiber can accept radiation from a multimode optical fiber, or from a solid state source (e.g., via coupling through free-space optics).

In certain advantageous embodiments, the first optical fiber is configured to provide radiation from an optical fiber laser or optical fiber amplifier. For example, the first optical fiber can be an active optical fiber of a fiber laser or a fiber amplifier, e.g., a rare earth doped fiber, or a fiber configured to provide gain through some non-linear process (e.g., Raman scattering, Brillouin scattering).

In certain embodiments, the first optical fiber has substantially the same diameter as the mode mixing optical fiber. Such embodiments may be especially advantageous, in that the alignment of the first optical fiber to the mode mixing optical fiber (i.e., for optical coupling, for example, via fusion splicing) can be simplified. Similarly, in certain embodiments, the diameter of the core of the first optical fiber is within 10%, or even within 5% of the diameter of the core of the mode mixing optical fiber.

In certain embodiments, the mode mixing optical fiber can provide a beam having desirable optical characteristics from its second end. For example, in certain embodiments, the optical system is configured to launch a free space-propagating beam (e.g., as identified by reference numeral 1360 in FIG. 13) from the second end of the mode mixing optical fiber. In such embodiments, the mode mixing optical fiber can act as a beam delivery fiber, and can be configured in a beam delivery cable, e.g., ruggedized to allow for handling in an industrial environment. If necessary, additional optics (e.g., collimating lenses and/or other diffractive or refractive elements) can be provided at the output end of the mode mixing optical fiber.

In other embodiments, the optical system further includes a second optical fiber the second optical fiber being a multi-mode at the wavelength, the second optical fiber having an input end and an output end, the input end of the second optical fiber being directly optically coupled to the output end of the mode mixing optical fiber. One particular embodiment is shown in schematic view in FIG. 14. Optical system 1430 includes a first optical fiber 1440 and a mode mixing optical fiber 1400 with the output 1444 of the first optical fiber directly optically coupled to the input 1402 of the mode mixing optical fiber as described above. Optical system 1400 further includes a second optical fiber 1450, having an input end 1452 and an output end 1454, with the input end 1452 of the second optical fiber directly optically coupled (here, fusion spliced) to the output end 1404 of the mode mixing optical fiber. In such embodiments, the mode mixing optical fiber can act to transform the optical characteristics of the output of the first optical fiber (e.g., intensity profile) to a more desirable state (e.g., having a flat-top intensity profile) to be coupled into the second optical fiber.

The system can be configured to launch a free space-propagating beam (e.g., as identified by reference numeral 1460 in FIG. 14) from the second end of the second optical fiber. In such embodiments, the second optical fiber can act as a beam delivery fiber, and can be configured in a beam delivery cable, e.g., ruggedized to allow for handling in an industrial environment. If necessary, additional optics (e.g., collimating lenses and/or other diffractive or refractive elements) can be provided at the output end of the second optical fiber.

Figure 15:
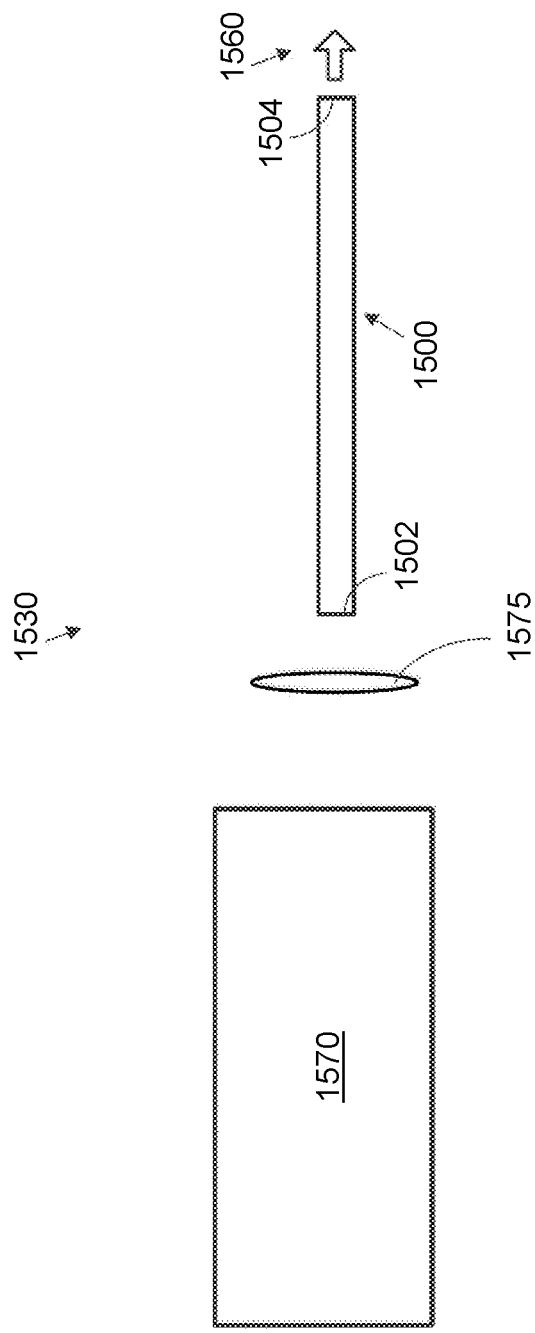
FIG. 15 is a schematic view of an optical system according to another embodiment of the disclosure.

In other embodiments, an optical system includes a mode mixing optical fiber having its input end coupled to the output of an optical source, such as a solid state laser. The optical source can be coupled to the input end of the mode mixing fiber, for example, using free-space optics. An example of such an embodiment is shown in FIG. 15. Optical fiber system 1530 includes an optical source 1570 (e.g., a solid-state laser) having its output coupled to the input end 1502 of mode mixing optical fiber 1500 through free-space optics 1575 (e.g., one or more lenses). A free space-propagating beam (e.g., as identified by reference numeral 1560 in FIG. 15) can be emitted from the second end 1500 of the mode mixing optical fiber.

The diameter of the core of the second optical fiber can vary depending on the end-user needs, for example, to allow for implementation in already existing systems. The diameter of the core of the second optical fiber can be, for example, within about 10%, or even within about 5% of the diameter of the core of the mode mixing optical fiber. Of course, in other embodiments, the core of the second optical fiber can be a different size, e.g., in the range of about 50 μm to about 3000 μm, or about 50 μm to about 2000 μm, or about 50 μm to about 1000 μm, or about 50 μm to about 600 μm, or about 100 μm to about 3000 μm, or about 100 μm to about 2000 μm, or about 100 μm to about 1000 μm, or about 100 μm to about 600 μm, or about 200 μm to about 3000 μm, or about 200 μm to about 2000 μm, or about 200 μm to about 1000 μm, or about 200 μm to about 600 μm.

Another aspect of the disclosure is a method for providing a free space-propagating optical beam using an optical system as described herein. The method includes propagating radiation of the wavelength from the first optical fiber into the mode mixing optical fiber; and propagating the radiation from the output end of the mode mixing optical fiber. If the system includes a second optical fiber as described above, the method can further include propagating the radiation through the second optical fiber and from its output end. The method can be performed such that the divergence, BPP and/or flatness is as described in any embodiment above.

As described above, the mode mixing optical fibers, apparati and methods described herein can be used to provide an output beam having a desired BPP and/or profile (e.g., a "flat-top" profile). As such, the mode mixing optical fibers can be useful in beam delivery, as described above. The mode mixing optical fibers can be useful, for example, in providing an output beam having a desired BPP and/or profile (e.g., a relatively "flat-top" profile) from a supercontinuum fiber source, or from another source having a relatively wide spectral output. The mode mixing optical fibers described herein can be configured to provide the desired output over a broad spectral range.

But in view of the description herein, the person of ordinary skill in the art will appreciate that the mode mixing optical fibers as described herein can be used in a variety of ways in optical fiber devices, for example, optical fiber lasers and amplifiers and optical devices such as pump couplers and combiners. For example, another aspect of the disclosure is a method for making a pump coupler or pump combiner that includes providing a mode mixing optical fiber as described herein, and fabricating it into a pump coupler or pump combiner.

The mode mixing optical fibers described herein can be used to deliver pump energy to an active optical fiber (having an amplified wavelength) of an optical amplifier or optical laser. By providing pump energy having a desired intensity distribution (e.g., a relatively "flat-top" intensity profile, for example as in any embodiment described above) to the active optical fiber, the overlap between the pump radiation (i.e., having the wavelength) and the mode of the amplified radiation (i.e., having the amplified wavelength) can be somewhat reduced. This can have a number of advantages. Advantageously, pump radiation that is coupled into the active optical fiber can be provided with a desired intensity profile so that it overlaps desirably with radiation of the amplified wavelength in the active optical fiber as described above. For example, this can reduce the efficiency of the pump absorption in the first section of the active optical fiber, and thus reduce the amount of heat generated in the first section of the optical fiber. Such heat generation is often a limiting factor in amplification, and so reduction of such heat generation can increase the amount of amplification that is able to be achieved for a given active optical fiber. Accordingly, one aspect of the disclosure is a device including an active optical fiber having a first end; and one or more mode mixing pump fibers (i.e., each a mode mixing fiber as described herein, configured to provide mode mixing at the pump wavelength) each having an output end operatively coupled to the first end of the active optical fiber. The mode mixing pump fiber(s) can be coupled to the first end of the active optical fiber, for example, through a pump coupler or combiner and/or by being spliced to the first end of the active optical fiber, as described in more detail below.

For example, one aspect of the disclosure is an optical fiber device comprising a pump coupler or combiner having a one or more pump input ports and an output port; and an active optical fiber having a pump wavelength and an amplified wavelength, the active optical fiber having a first end operatively coupled to the output port of the pump coupler or combiner. The device includes one or more mode mixing pump fibers (i.e., each a mode mixing fiber as described herein); the optical radiation to be delivered by the one or more mode mixing pump fibers is pump radiation having the pump wavelength of the active optical fiber. Each mode mixing pump optical fiber has an input end an output end, with each output end being operatively coupled to a pump input port of the pump coupler or combiner. As the person of ordinary skill in the art would appreciate, the pump coupler or combiner is configured to couple radiation from the pump wavelength into the active optical fiber.

Figure 16:
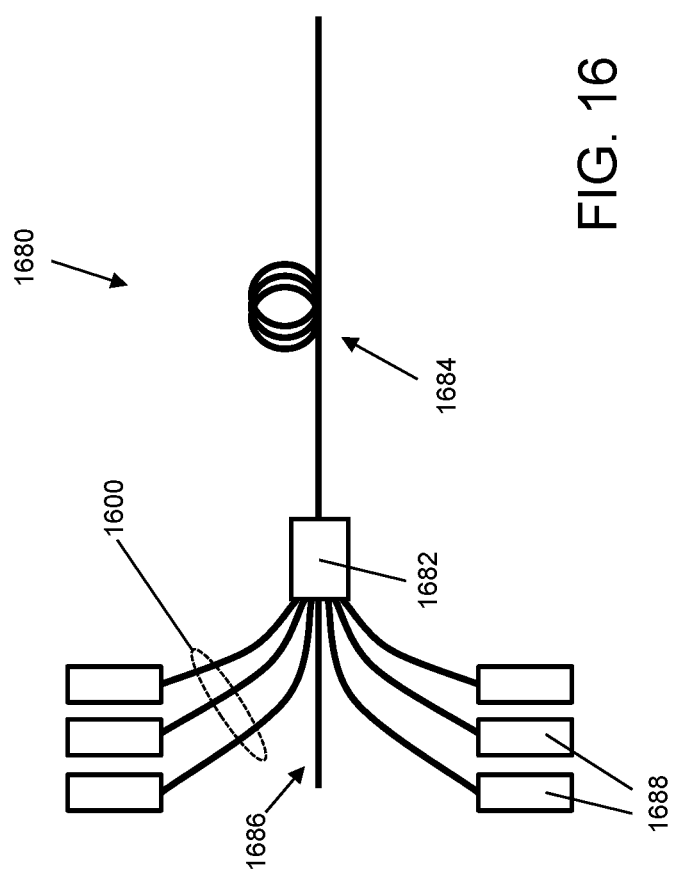
FIG. 16 is a schematic view of an optical system according to another embodiment of the disclosure.

One example of an optical device according to this aspect of the disclosure, configured as an amplifier, is shown in partial schematic view in FIG. 16. In the particular optical fiber device 1680 of FIG. 16, a pump coupler or combiner 1682 has six pump input ports and one output port. The device 1680 includes six mode mixing pump optical fibers 1600, each having an input end and an output end, each having its output end operatively coupled to one of the pump input ports of the pump coupler or combiner 1682. In the device of FIG. 16, a pump source 1688 (i.e., a source of radiation of the pump wavelength) is coupled to each mode mixing pump optical fiber at its input end; the person of ordinary skill in the art will appreciate that such coupling can be performed via free-space or fiber coupling. The device also includes an active optical fiber 1684 having a first end operatively coupled to the output end of the coupler 1682. In the embodiment of FIG. 16, the device further includes an input optical fiber 1686, operatively coupled to a signal input port of the optical fiber coupler. The input optical fiber can be used to provide a seed signal at the active wavelength, as would be appreciated by the person of ordinary skill in the art. Of course, in certain embodiments, there is no input optical fiber; in such cases, the active optical fiber can be used to amplify spontaneous emission. In such cases, the "active wavelength" is a range of wavelengths corresponding to wavelengths at which the active optical fiber can provide gain (typically a range of tens of nanometers in wavelength). The active optical fiber can be, for example, a so-called dual-clad fiber, having an inner core configured to guide radiation of the active wavelength, a pump core surrounding the inner core and configured to guide radiation of the pump wavelength, and one or more claddings surrounding the pump core. The output port of the pump coupler or combiner can be configured to launch pump radiation from the pump coupler or combiner to be guided in the pump core of the dual-clad optical fiber.

Moreover, the person of ordinary skill in the art will appreciate that many pump couplers and pump combiners are made by fusing and drawing down a plurality of optical fibers. In such embodiments, the pump coupler or pump combiner can be formed using mode mixing optical fibers, such that output ends of the mode mixing pump fibers transition into the coupler or combiner adiabatically.

Figure 17:
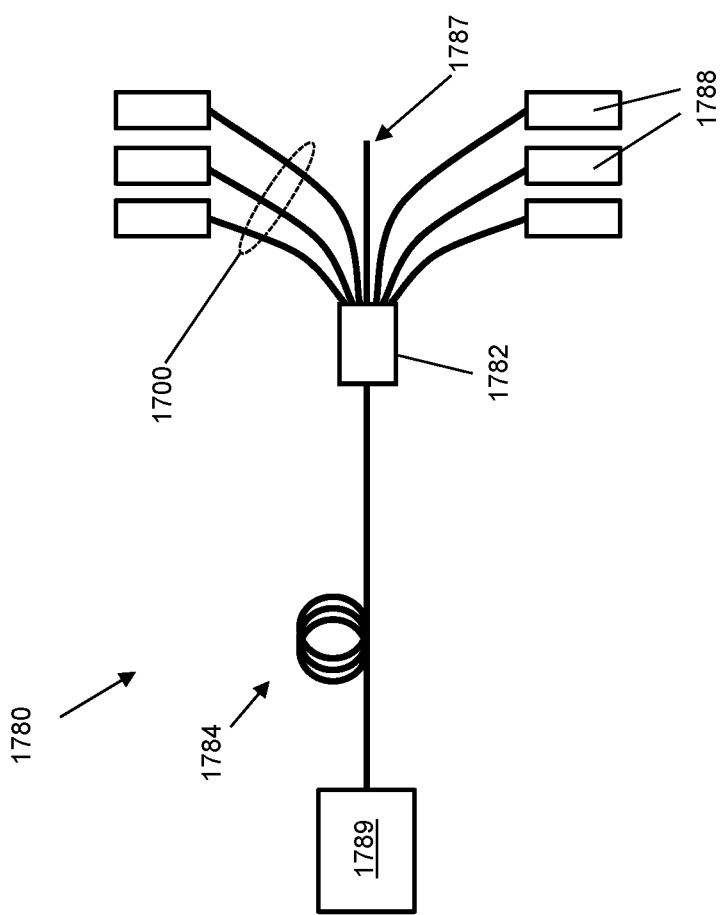
FIG. 17 is a schematic view of an optical system according to another embodiment of the disclosure.

The device 1680 of FIG. 16 is configured as an amplifier in a co-pumped configuration. In such an embodiment, the pump radiation and amplified radiation propagate in the same direction along the active optical fiber (i.e. from the first end to the second end of the active optical fiber). The person of ordinary skill in the art will appreciate that such amplifiers can also be configured in a counter-pumped configuration, or with co- and counter-pumping. For example, optical fiber device 1780 of FIG. 17 includes an active optical fiber 1784 having a first end operatively coupled to the output port of pump coupler or combiner 1782. Its second end is operatively coupled to seed laser 1789. Coupled to the pump input ports of the pump coupler or combiner 1782 at their output ends are mode mixing pump fibers 1700. As in the embodiment of FIG. 17, the input ends of the mode mixing pump fibers 1400 are operatively coupled to pump sources 1788. In use, the pump radiation is propagated from the first end to the second end of the active optical fiber, while amplified radiation of the active wavelength is propagated from the second end to the first end of the active optical fiber (i.e., along the same direction of the fiber as the radiation from the seed laser 1789).

Figure 18:
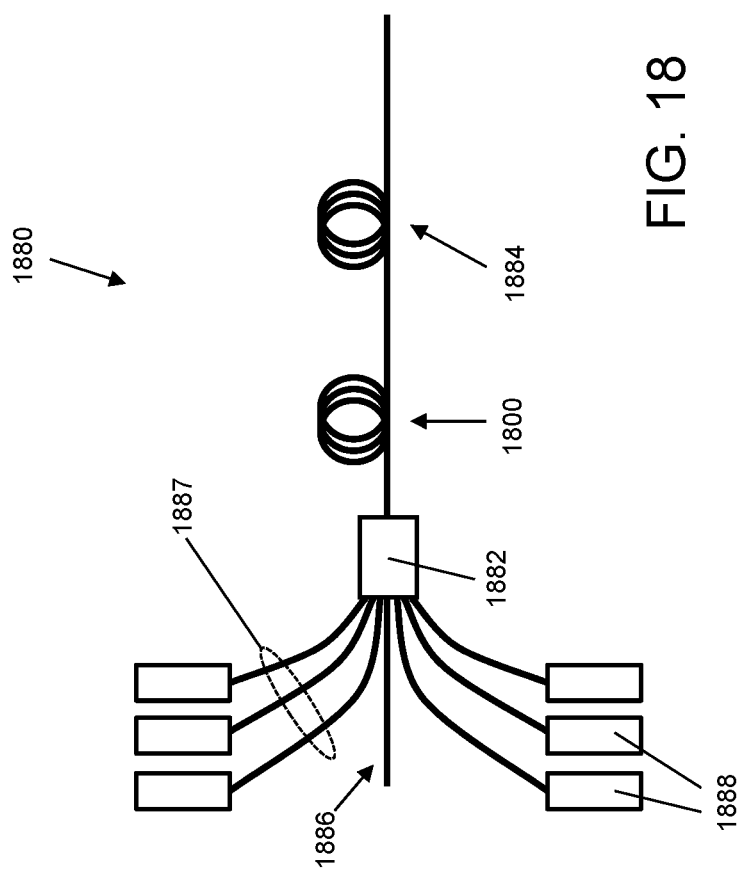
FIG. 18 is a schematic view of an optical system according to another embodiment of the disclosure.

Another embodiment is shown in schematic view in FIG. 18. In this embodiment, conventional optical fibers can be used to couple pump sources to a pump coupler or combiner, while a mode mixing pump fiber is coupled between the pump coupler or combiner and the active optical fiber in order to provide pump radiation to the active optical fiber having a desired intensity profile (e.g., a "flat-top" intensity profile). As described above, provision of pump radiation to an active optical fiber with a relatively flat-top intensity profile (e.g., as described in any embodiment above) can help to reduce the amount of overlap of the pump radiation with the amplifying core of the fiber, and thus spread heat generation farther along the active fiber, allowing for higher power amplification to be achieved. In device 1880 of FIG. 18, a pump coupler or combiner 1882 has six pump input ports and one output port. The device 1880 includes six pump optical fibers 1887, each having an input end and an output end, each having its output end operatively coupled to one of the pump input ports of the pump coupler or combiner 1882. In the device of FIG. 18, a pump source 1888 (i.e., a source of radiation of the pump wavelength) is coupled to each mode mixing pump optical fiber at its input end; the person of ordinary skill in the art will appreciate that such coupling can be performed via free-space or fiber coupling. The device also includes a mode mixing optical fiber 1800 having an input end operatively coupled to the output port of the coupler 1882. The mode mixing optical fiber 1800 is configured to be mode mixing for radiation of the pump wavelength, such that the pump radiation output by the output port of the coupler 1882 is distributed into various higher-order modes therein. This can provide pump radiation having a desired intensity profile (for example, a relatively "flat-top" intensity profile as described in any embodiment above) at the output end of the mode mixing optical fiber. The output end of the mode mixing optical fiber is operatively coupled to the first end of an active optical fiber 1884. In the embodiment of FIG. 18, the device further includes an input optical fiber 1886, operatively coupled to a signal input port of the optical fiber coupler. Thus, a seed laser signal (or other source signal) can be coupled into the active optical fiber; in such cases, it can be desirable for the mode mixing optical fiber to include a second core as described above with respect to FIG. 10. But in certain cases where there is no need to input a seed signal (or other source signal) into the active optical fiber (e.g., when the device is configured as an amplified spontaneous emission source), there may be no need for the mode mixing optical fiber to include a second core.

Here, too, while the embodiment of FIG. 18 is shown in a co-pumped configuration, the person of ordinary skill in the art will appreciate that the devices can be configured in a counter-pumped configuration or with both co- and counter-pumping configurations.

Thus, mode mixing optical fibers as described herein can be useful in providing pump radiation to an active optical fiber.

In other embodiments, the mode mixing optical fibers can be used in lasers and amplifier systems to provide mode mixing of radiation of the active wavelength, e.g., in the innermost core of the fiber. Mode mixing of the active wavelength can, as described above, result in a number of advantages, including the coupling seed radiation across a large number of modes of a multimode active optical fiber and provision of amplified or generated radiation having a desired intensity profile (e.g., a relatively "flat-top" intensity profile) in order to allow for higher power operation. Thus, a mode mixing optical fiber as described herein can be used to couple seed radiation of an active wavelength from a seed source into a multimode active optical fiber (having the active wavelength) in order to increase the effective numerical aperture of the seed radiation to be closer to the numerical aperture of the multimode active optical fiber.

Figure 19:
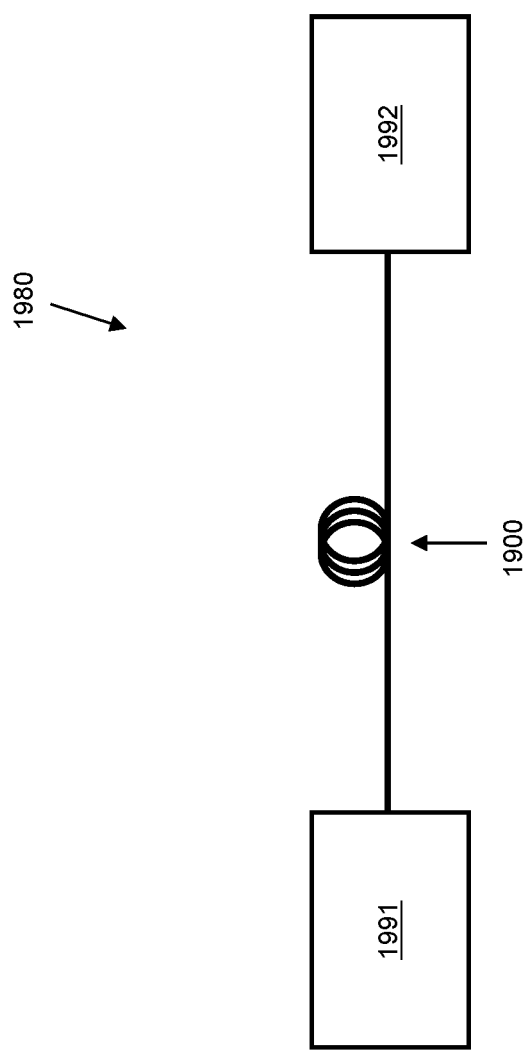
FIG. 19 is a schematic view of an optical system according to another embodiment of the disclosure.

For example, one embodiment is shown in partial schematic view in FIG. 19. Optical system 1980 includes a source 1991 of radiation of an active wavelength. The source 1991 is configured to output radiation of the active wavelength in a single mode or in a few modes (e.g., 10 or fewer modes, 7 or fewer modes, 4 or fewer modes or even in a single mode) at an output thereof (e.g., through an output fiber thereof). The source can be, for example, a seed laser or one or more earlier laser or amplifier stages of the optical system. The device also includes a multimode amplifier or laser 1992 comprising a multimode active optical fiber (e.g., having five or more, 10 or more or even 15 or more modes at the active wavelength) having a signal input. In such a system, if a conventional optical fiber is used to couple the source to the signal input of the multimode amplifier, the various modes of the multimode active optical fiber of the multimode amplifier interact with the radiation from the source to a different extent, leading to an amplified intensity profile that varies substantially over the cross-sectional area of the fiber, as described in more detail below. This can limit the amount of power that the multimode amplifier, and thus the entire system, can provide. Accordingly, in the embodiment of FIG. 19, a mode mixing optical fiber 1900 has an input end operative coupled to the output of the source 1991, and an output end operatively coupled to the input of the active optical fiber of the multimode amplifier or laser 1992. The use of the mode mixing fiber can allow radiation from the source to be provided to the multimode amplifier with a desired intensity profile (e.g., a relatively "flat-top" profile as described in any embodiment above), and thus allow the radiation of the source to be coupled into substantially more of the modes of the multimode optical fiber. This can allow for increased power and improved system stability, as described in more detail below. Desirably, the core size of the mode mixing optical fiber is similar to that of the multimode active optical fiber of the multimode amplifier (e.g., within about 25%, or within about 10%). As described above (e.g., with respect to beam delivery), a mode mixing optical fiber can also be used at an output of the multimode amplifier to provide output radiation with a desired intensity profile (e.g., a relatively "flat-top" profile as described in any embodiment above) to a workpiece or to then next amplifier or other system component in the optical path.

Alternatively, the source 1991 and the multimode amplifier or laser 1992 can be characterized by numerical aperture. A seed source having a relatively low numerical aperture can be coupled to a multimode active optical fiber in an amplifier or laser having a higher numerical aperture through a mode mixing optical fiber as described herein, such that the effective numerical aperture of the seed radiation is increased (e.g., by at least 10% or at least 20%, and, e.g., up to the numerical aperture of the multimode active optical fiber). Here, too, the mode mixing optical fiber can be used to fill more of the modes of the multimode active optical fiber.

Figure 20:
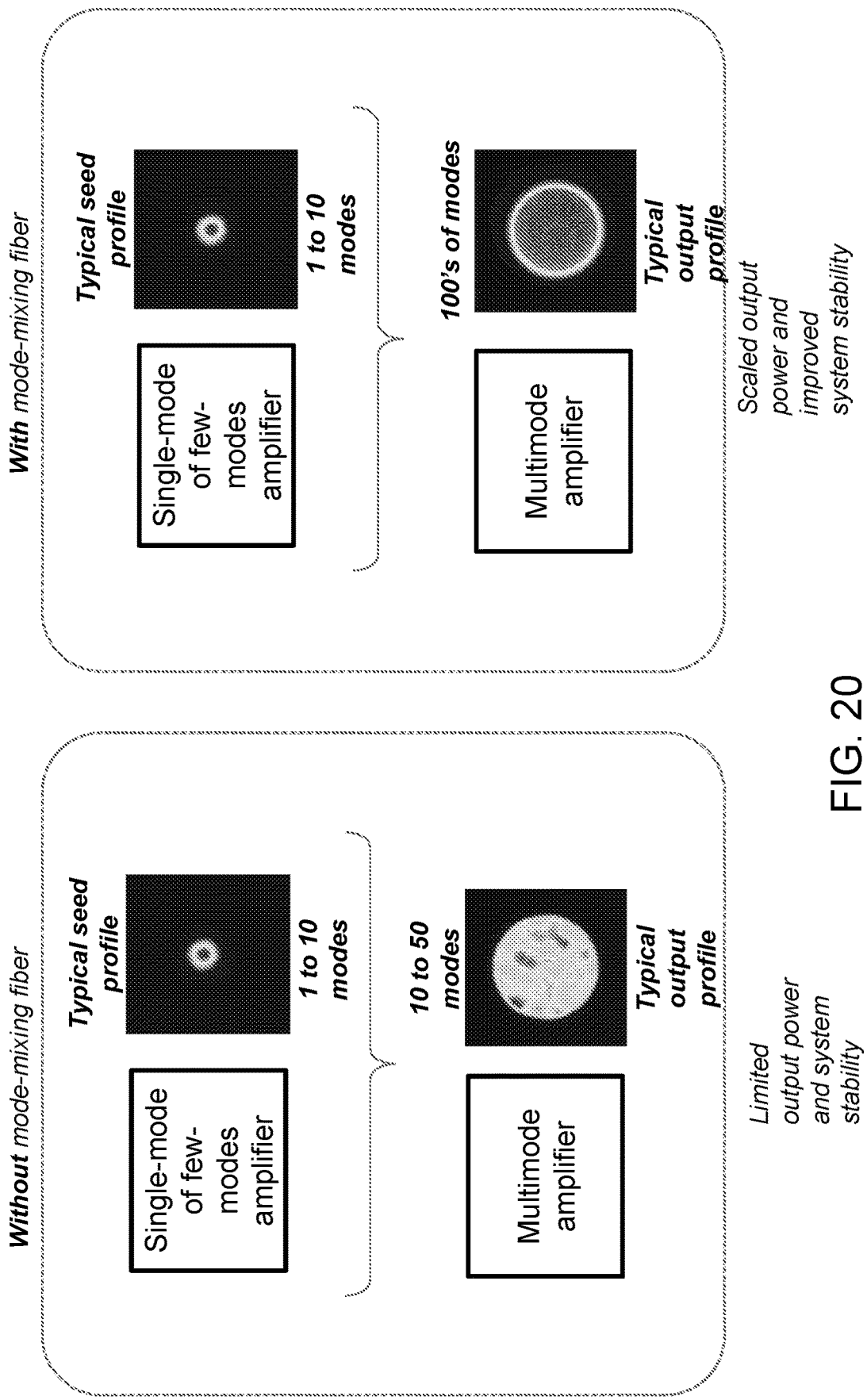
FIG. 20 is set of calculated intensity plots comparing a system using a mode mixing optical fiber in delivery of seed radiation to a multimode amplifier to a system lacking such a mode mixing optical fiber.

Use of a mode mixing optical fiber as described above with respect to FIG. 19 can allow for increased power scaling in multimode amplifier systems. Power scaling is typically achieved by assembling multiple amplifier modules, beginning with a single- or few-moded amplifier or laser stage and progressively increasing to multimode amplifiers. The radiation generated in the initial amplifier stages are used to seed the later, higher-power multimode amplifier stages. As shown in the comparison of FIG. 20, when coupling radiation from a single- or few-moded amplifier source to a multimode amplifier, the set of modes populated in the multimode amplifier by the radiation will depend on the spatial overlap of the modes with the radiation from the source. For example, the left-hand set of images of FIG. 20 demonstrates that when a mode mixing optical fiber is not used between a single- or few-moded source and a multimode amplifier, the intensity profile within the multimode amplifier is non-uniform, with spots of high and low intensity as a result of inefficient coupling across a wide number of modes of the multimode active optical fiber. Using a mode mixing optical fiber to perform the coupling between a single- or few-moded source and a multimode amplifier or laser allows the multimode amplifier or laser to be seeded with radiation having a relatively "flat-top" intensity profile, and/or with a higher numerical aperture than the seed source (e.g., by at least 10% or at least 20%, and, e.g., up to the numerical aperture of the multimode active optical fiber), so that more of the modes of the multimode amplifier or laser fiber are excited. This can allows for a high degree of power scaling and an improved system stability as a result of the lack of "hot spots" within the multimode active fiber, especially when the mode mixing optical fiber reduces the amount of speckle in the seed radiation.

One particular embodiment is shown in partial schematic view in FIG. 21. Here, optical system 2180 includes a multimode active fiber 2184, with pump lasers 2188 configured to pump it. Specifically, optical system 2180 includes pump coupler or combiner 2182, having pump lasers 2188 coupled to the pump input ports thereof through pump fibers 2187. Seed laser source 2191 (configured to operate at the active wavelength of the multimode active optical fiber) is coupled to a signal input port of the coupler 2182 via signal optical fiber 2186. The output of the pump coupler or combiner 2182 is operatively coupled to a first end of a mode mixing optical fiber 2100, which is configured to be mode mixing for the active wavelength (i.e., in any manner as described herein). The second end of the mode mixing optical fiber 2100 is operatively coupled to a first end of the multimode active fiber 2184. Here, radiation from the seed laser source is coupled through the coupler 2182 and into mode mixing optical fiber 2100, where it can be coupled into higher order modes to provide a desired intensity profile (e.g., to be spread more evenly through the cross-sectional area of the core of the mode mixing fiber, for example to provide a relatively "flat-top" profile, as described in any embodiment above). Thus, the power can be coupled to a variety of modes of the multimode active optical fiber, thus allowing for increased power scaling and system stability. The system can also benefit from a substantially "flat-top" beam being delivered from the multimode active optical fiber.

The core of a multimode active optical fiber can also benefit from mode mixing. Thus, in certain embodiments, the mode mixing optical fiber has a mode mixing active core (e.g., doped with a rare earth as described above), for example, as described above with respect to FIG. 9. In conventional multimode amplifiers, as a multimode active optical fiber is pumped, only one or a few of the modes are effectively amplified, depending on, for example, the overlap of the pump radiation with the modes, the amount of seed source signal that is coupled into the various modes, the gain profile of the active optical fiber (e.g., as a result of dopant concentration). Use of a mode mixing active optical fiber in which the active core is configured to provide mode mixing can help to distribute amplified or generated radiation among various higher order modes. Thus, even if most of the radiation is generated or amplified from only one or a few modes, such radiation can be spread across many modes of the fiber, resulting in more even heating of the fiber and a desired beam output. Thus, such a system architecture can, for example, allow a high degree of scaling of power, shorter fiber length for single-frequency lasers, and the provision of random lasers, speckle-free systems and high stability multimode lasers, as well as providing for a desired intensity profile (e.g., "flat-top") as described above.

One example of such a system is shown in schematic view in FIG. 22. Optical fiber system 2280 is configured as an optical fiber laser, with a mode mixing active optical fiber 2200 operatively disposed between at least partially reflective elements (here, Bragg gratings 2293). The person of ordinary skill in the art can use conventional fiber laser cavity constructions in the practice of such embodiments. The input end of the mode mixing active optical fiber 2200 is operatively coupled (i.e., through the Bragg grating) to a pump source 2288. Optionally, and as shown in FIG. 22, the input end of the mode mixing active optical fiber can be coupled to the pump source 2288 through a mode mixing pump fiber 2201 (e.g., as described above with respect to FIG. 18). And a mode mixing optical fiber 2202 can be operatively coupled to the output end of the mode mixing active optical fiber (i.e., through the Bragg grating) for use as a beam delivery fiber as described above. Of course, conventional optical fibers can be used to couple the pump radiation into the active optical fiber and to deliver the laser radiation.

The embodiments described with respect to FIGS. 16-21 are configured as amplifier devices, i.e., without a laser cavity including the active optical fiber. The person of ordinary skill in the art will appreciate that each of these devices may alternatively be configured as optical fiber laser devices, i.e., with the active optical fiber operatively disposed between two partially reflective elements such as fiber Bragg gratings, as shown in FIG. 22.

In another embodiment, a section of a passive mode mixing fiber can be disposed within a laser cavity (i.e., together with an active optical fiber) to help increase gain homogeneity. One example of such a system is shown in schematic view in FIG. 23. Optical fiber system 2380 is configured as an optical fiber laser, with an active optical fiber 2384 operatively disposed between at least partially reflective elements (here, Bragg gratings 2393) as is conventional. The input end of the active optical fiber 2384 is operatively coupled (i.e., through the Bragg grating) to a pump source 2388. Optionally, and as shown in FIG. 23, the input end of the mode mixing active optical fiber can be coupled to the pump source 2388 through a mode mixing pump fiber 2301 (e.g., as described above with respect to FIG. 18). And a mode mixing optical fiber 2302 can be operatively coupled to the output end of the active optical fiber (i.e., through the Bragg grating) for use as a beam delivery fiber as described above. Of course, conventional optical fibers can be used to couple the pump radiation into the active optical fiber and to deliver the laser radiation. In this embodiment, a mode mixing optical fiber as described herein is coupled between the active optical fiber and an at least partially reflective element. As light is amplified by successive passes between the reflective elements, any spatial gain inhomogeneity in the active optical fiber 2384 can be spread out to be more flat in gain profile by the mode mixing optical fiber 2300. Accordingly, a substantially flat-top beam can be output from the laser even when a conventional beam delivery fiber is used to output the amplified radiation. The person of ordinary skill in the art will appreciate that in certain embodiments (e.g., when the mode mixing optical fiber 2300 has a sufficiently high concentration of germanium), the output grating 2393 can be formed in the mode mixing optical fiber 2300 itself.

The present inventors have determined that the especial problem of amplification or generation of radiation in only particular modes is not limited to optical fiber amplifiers and lasers. Rather, other multimode device architectures can suffer from radiation being generated/amplified in only one or a few of the possible modes. Thus, another aspect of the disclosure is an optical device including an optical gain medium (i.e. a medium that can generate or amplify radiation upon being pumped with pump radiation) that is configured as a mode mixing optical medium as described herein. For example, the optical gain medium may include down-doped and/or up-doped structures as described above. The person of ordinary skill in the art will appreciate that the optical gain medium can be, for example, any substantially solid material (i.e. not limited to glass).

Various aspects and embodiments of the disclosure will be further explained with reference to the following non-limiting Examples:

EXAMPLES

The mode mixing effect of certain mode mixing optical fibers described herein was demonstrated both numerically and experimentally.

Example 1

Figure 14:
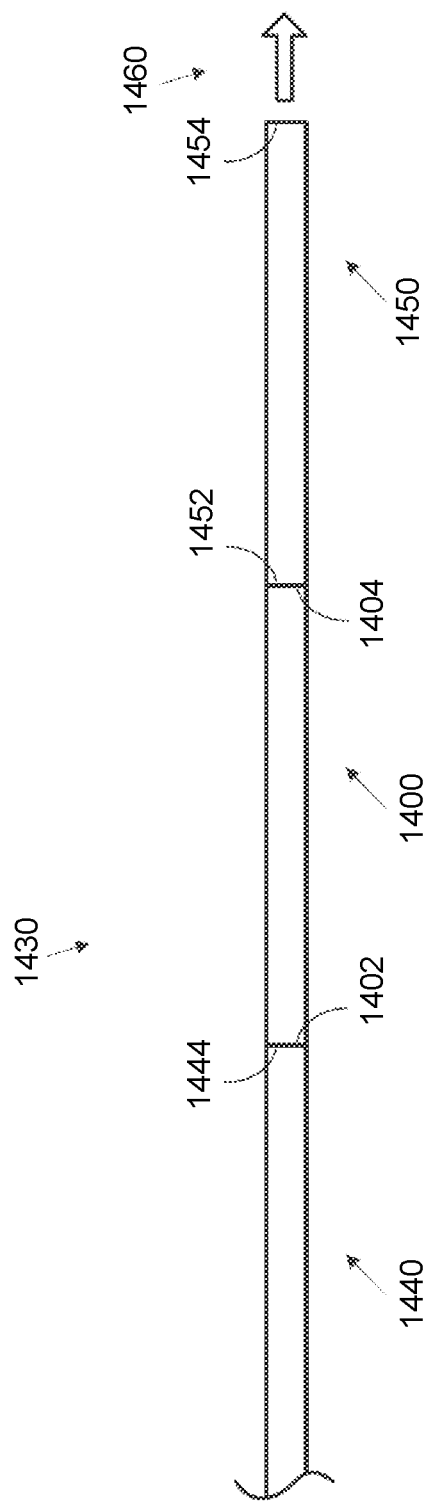
FIG. 14 is a schematic view of an optical system according to another embodiment of the disclosure.

In Example 1, the overall test configuration was as shown in FIG. 14, with the mode mixing fiber configured to transform radiation output from a large mode area single mode fiber to a beam delivery cable.

Figure 25:
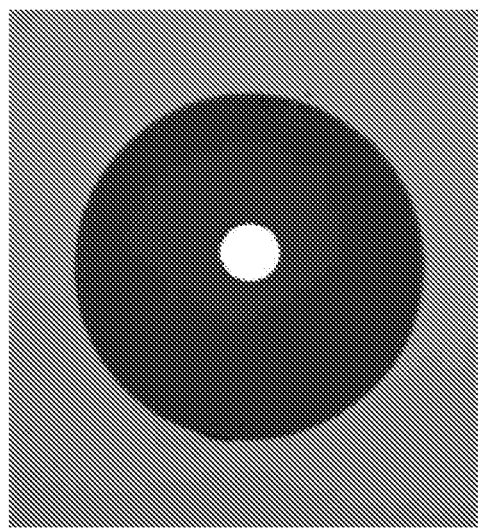
FIG. 25 is a picture of a cleaved fiber endface of the mode mixing optical fiber used in the experiments of Example 1.
Figure 24:
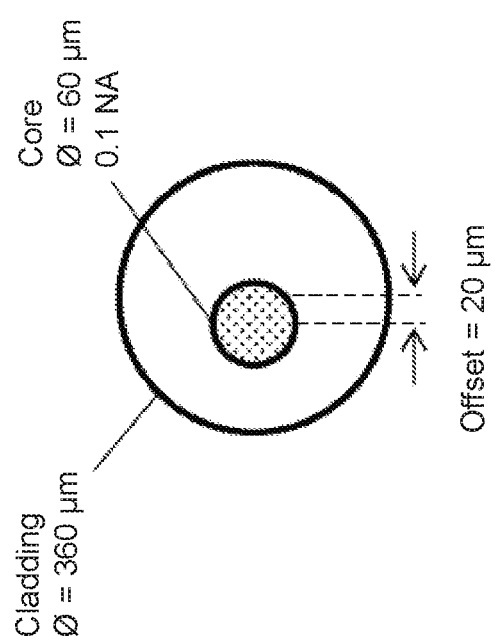
FIG. 24 is a schematic cross-sectional view of the mode mixing optical fiber used in the experiments of Example 1.

The mode mixing optical fiber is shown in schematic view in FIG. 24, with the cleaved fiber endface shown in the photograph of FIG. 25. The mode mixing optical fiber has a germanium-coped core 60 µm in diameter, with a step index profile. The core has a numerical aperture of 0.11, and is laterally offset with respect to the centerline of the overall optical fiber by 20 µm. The overall fiber diameter is 360 µm.

The first optical fiber is a conventional large mode area single mode fiber having a 20 µm diameter core, numerical aperture of 0.06, and overall diameter of 400 µm. The second optical fiber (i.e., of the beam delivery cable) is matched to certain commercially available devices, and has a 100 µm diameter core, a numerical aperture of 0.22, an overall fiber diameter of 360 µm and a length of 25 m.

The results of calculations are shown in FIGS. 26-28. The power distribution among the modes excited in the beam delivery cable is shown in FIG. 26. The total output intensity delivered by the beam delivery cable is shown in FIG. 27, and the corresponding beam profile is shown in FIG. 28. The output beam is flat-top shaped and the BPP is estimated to be about 3.4 mm·mrad.

Figure 32:
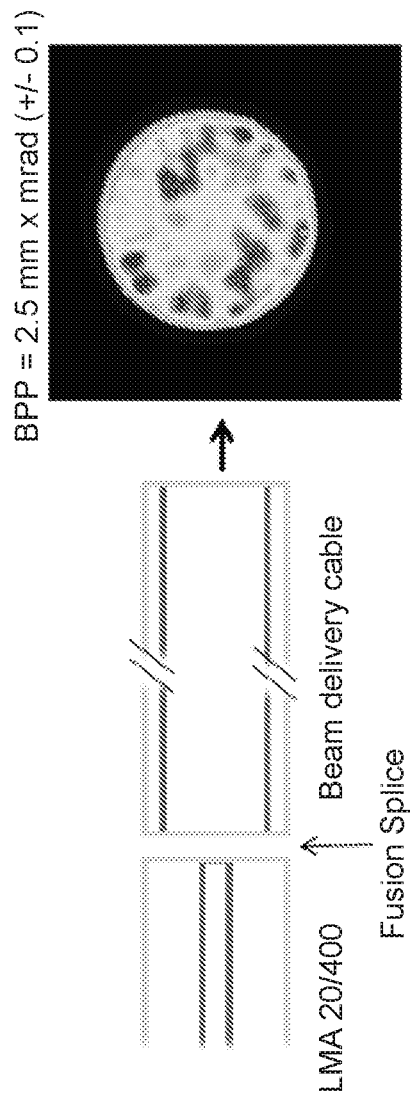
FIG. 32 is a schematic view of a conventional system and a 2D graph of the total output intensity delivered thereby as described in the experiments of Example 1.
Figure 33:
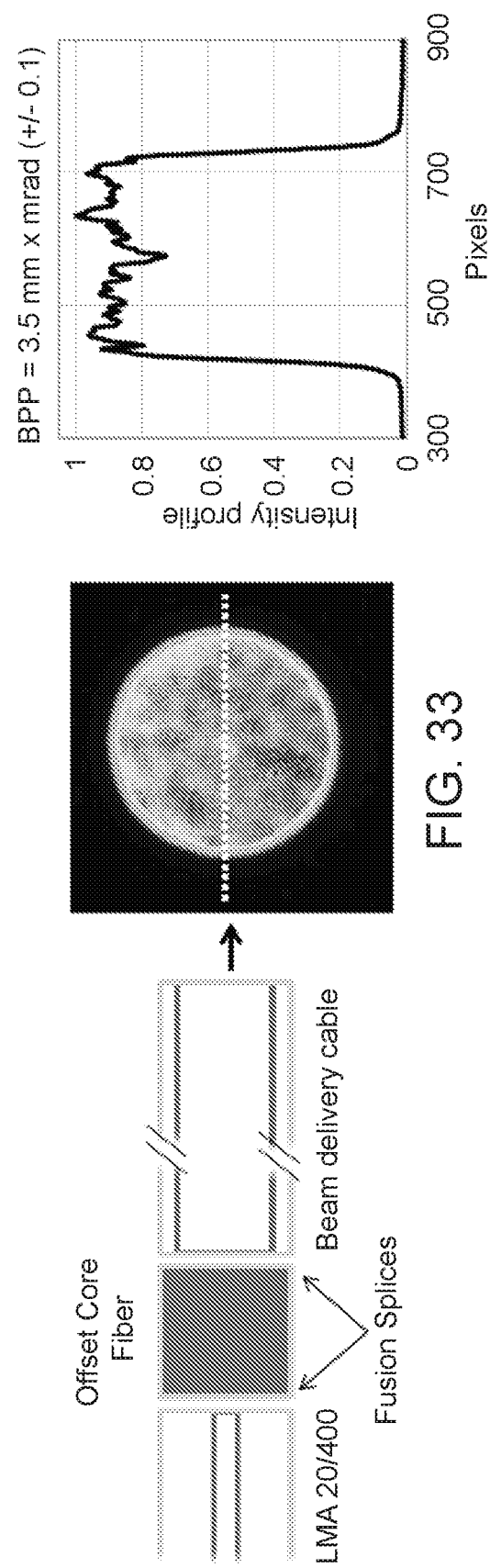
FIG. 33 is a schematic view of an optical system including an offset core mode mixing fiber and a 2D graph of the total output intensity delivered thereby as described in the experiments of Example 1.

The mode mixing effect induced by the mode mixing fiber appears clearly when comparing these results to the case without a mode mixing fiber, shown in FIGS. 29-31. With the otherwise same parameters, the simulation performed without the mode mixing optical fiber provides a sharply-peaked output beam, Experimental results were also collected. In the case without the mode mixing optical fiber (as described with respect to FIGS. 29-31), the beam emerging the conventional beam delivery cable was characterized by recording the near-field intensity profile and the BPP. Results are shown in FIG. 32. Due to the low degree of mode-mixing, the beam profile is very uneven and the measured BPP of 2.5 mm·mrad out of the especially desired range of 3 to 4 mm·mrad. In contrast, when using the mode mixing optical fiber, as described above with respect to FIGS. 24-28, the near-field profile shows a good uniformity (FIG. 33) with BPP values around 3.5 mm·mrad.

Example 2

Figure 13:
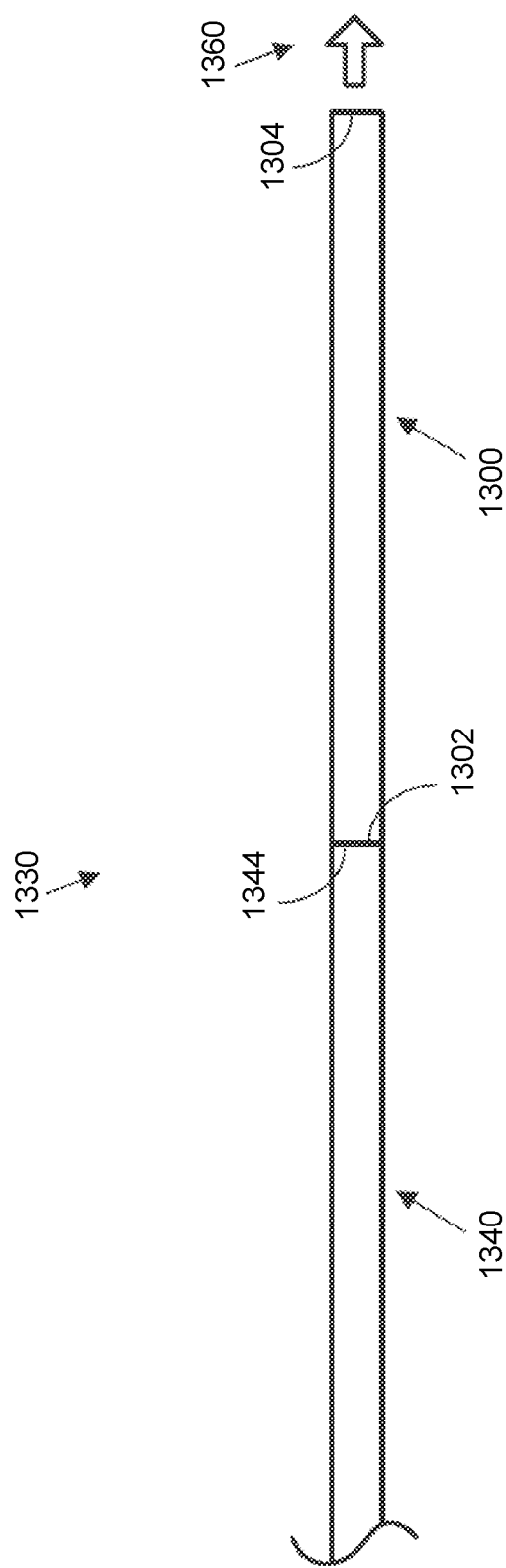
FIG. 13 is a schematic view of an optical system according to one embodiment of the disclosure.
Figure 35:
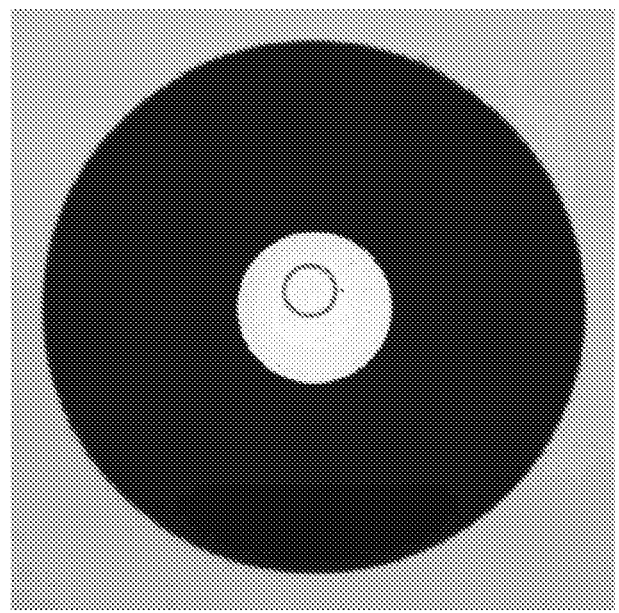
FIG. 35 is a picture of a cleaved fiber endface of the mode mixing optical fiber used in the experiments of Example 2.
Figure 36:
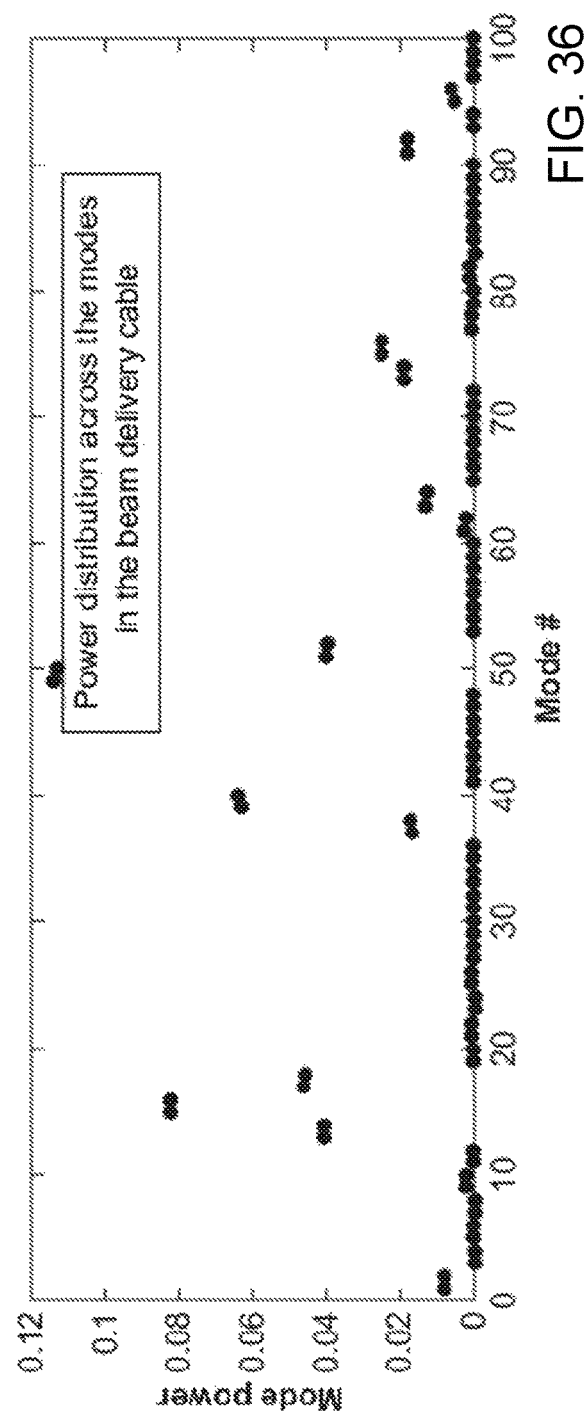
FIG. 36 is a graph showing the calculated power distribution among modes excited in the mode mixing beam delivery cable in the experiments of Example 2.
Figure 38:
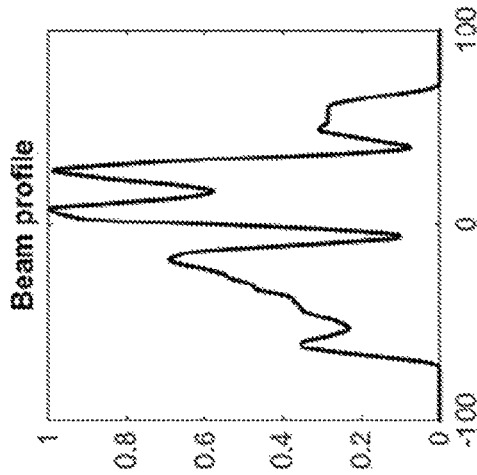
FIG. 38 is a plot of the calculated profile of the beam delivered by the mode mixing beam delivery cable in the experiments of Example 2.
Figure 37:
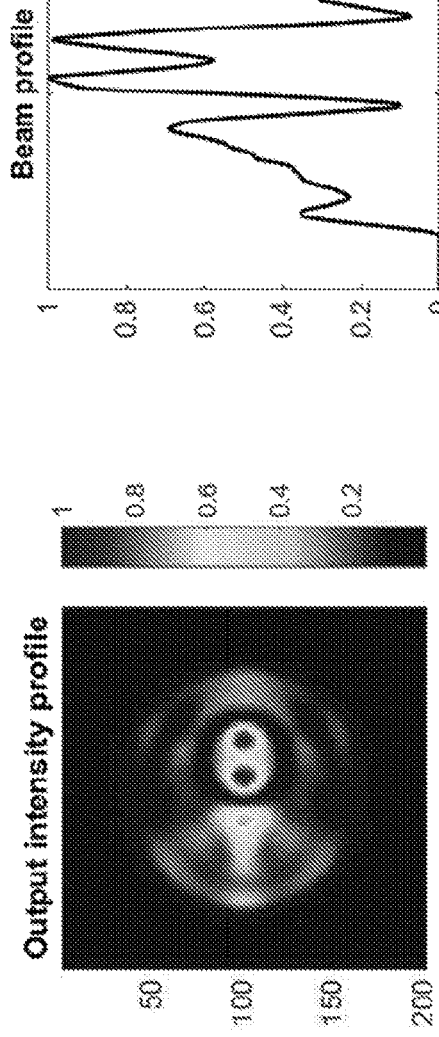
FIG. 37 is a 2D plot of the calculated total output intensity delivered by the mode mixing beam delivery cable in the experiments of Example 2.

In this example, the system was configured with the mode mixing optical fiber as a beam delivery fiber (e.g., as shown in FIG. 13). Here, too, both simulation and experimental results are presented. Here, the mode mixing optical fiber has a silica core 100 µm in diameter, surrounded by a down-doped fluorine cladding layer sufficient to provide a numerical aperture of 0.22, with a silica outer cladding to provide an overall fiber diameter of 360 µm. The core includes a low-index ring formed by fluorine-doped silica. The ring is 4 µm in annular thickness, having an inner diameter of 30 µm with its center laterally offset from the centerline of the optical fiber by 12 µm. The design is shown in schematic cross-sectional view in FIG. 34, and a photograph of the cleaved endface of the fiber is shown in FIG. 35. The first optical fiber is a conventional large mode area single mode fiber as described above in Example 1. Calculation results are summarized in FIGS. 36-38, in which the power distribution among the modes excited in the mode mixing optical fiber is shown in FIG. 36; the total output intensity delivered by the second end of the mode mixing optical fiber is shown in FIG. 37; and the corresponding beam profile is shown in FIG. 38.

As noted above, in this Example, the mode mixing fiber is configured as a beam delivery cable. The mode up-conversion is demonstrated on the plot showing the power distribution in FIG. 36 (only the first 100 modes were plotted for clarity purposes). With these exact parameters, the BPP was estimated around 4 mm·mrad. However, the output beam is not calculated to be exactly flat-top shaped (although it is remarkably flat as compared to a Gaussian beam). This can be changed by the person of ordinary skill in the art by modifying appropriately the design of the fiber, the size and location of the core elements.

Figure 34:
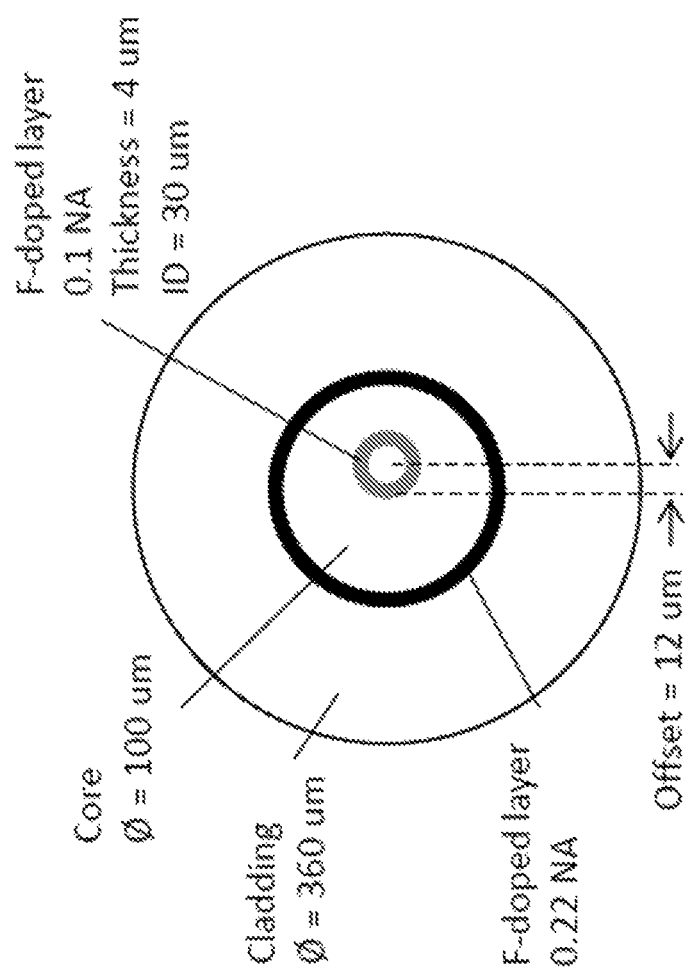
FIG. 34 is a cross-sectional schematic view of the design of the mode-mixing optical fiber used in the experiments of Example 2.

An experimental demonstration of the mode mixing created by the up-conversion beam delivery cable using the mode mixing fiber of FIGS. 34 and 35 is shown in FIG. 39. The measured intensity and beam profile displayed in FIG. 37 demonstrate good uniformity with a BPP measured at 3.9 mm·mrad, demonstrating the mode up-conversion occurring in this fiber used as beam delivery cable. This can be compared to the results shown in FIG. 30, which resulted from the use of a conventional beam delivery cable. The low-index ring does appear in the output intensity profile with a 50% intensity contrast compared to the maximum intensity. This ring contract can be reduced by modifying appropriately the fiber design.

Example 3

Figure 42:
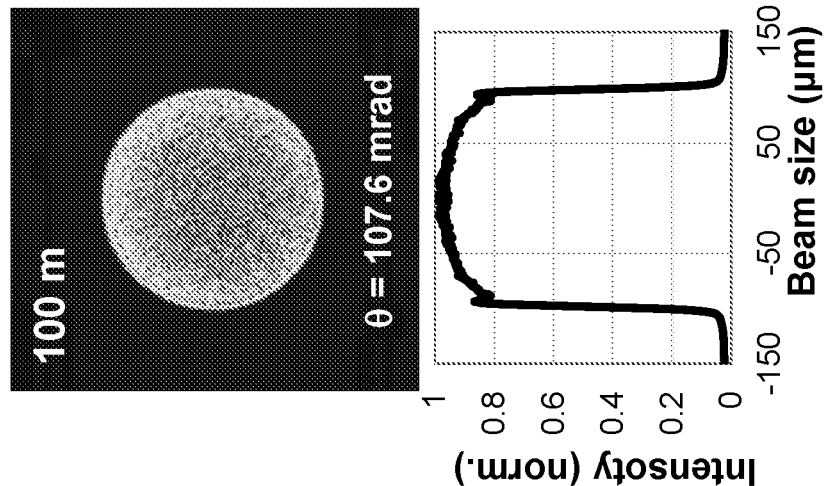
FIGS. 41 and 42 are sets of 2D and 1D intensity graphs for the experiments described in Example 3.
Figure 41:
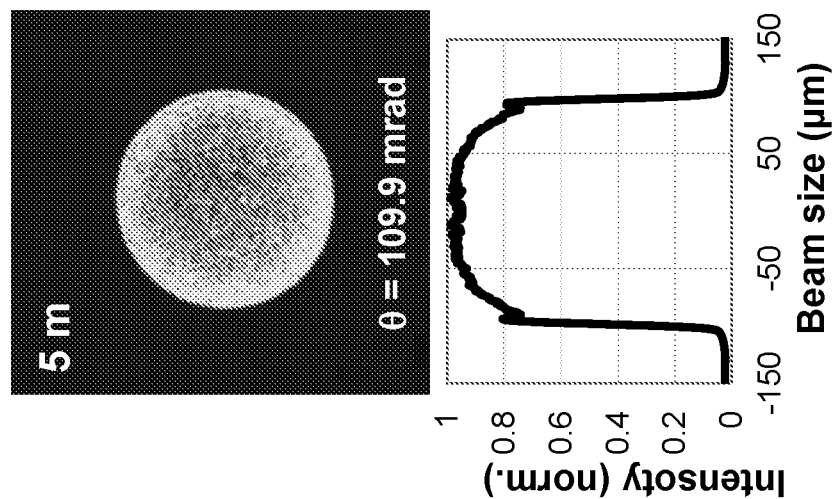
Figure 40:
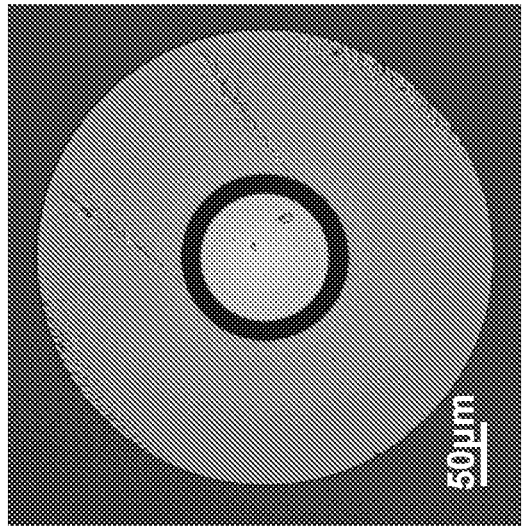
FIG. 40 is an image of the cleaved fiber endface of the optical fiber used in the experiments of Example 3.

A 100 µm core mode mixing optical fiber was constructed; an image of the cleaved fiber endface is shown in FIG. 40. It had substantially the same parameters as the optical fiber of FIG. 34, but with an NA for the fluorine-doped layer forming the off-center annular ring of 0.025 (i.e., instead of 0.1 as in FIG. 34). A fiber-coupled diode laser (1060 nm, NA~0.1, 100 mrad) was coupled to a 100 m length of the mode mixing optical fiber via fusion splicing. The output of the mode mixing fiber at the end of the 100 m length was measured; a 2D intensity graph and a 1D intensity graph (horizontally across the center of the 2D graph) are provided in FIG. 41. The length of the mode mixing optical fiber was shortened to 5 m, and the measurement repeated; results are shown in FIG. 42.

Example 4

A 50 μm core mode mixing optical fiber having the profile shown in FIG. 43 was constructed. A fiber-coupled diode laser (1060 nm, Gaussian beam, NA~0.038, 38 mrad, 20 μm core/400 μm cladding delivery fiber) was coupled to a 5 m length of the mode mixing optical fiber via fusion splicing. The output of the mode mixing fiber at the end of the 5 m length was measured; a 2D intensity graph and a 1D intensity graph (horizontally across the center of the 2D graph) are provided in FIG. 44.

Example 5

Figure 46:
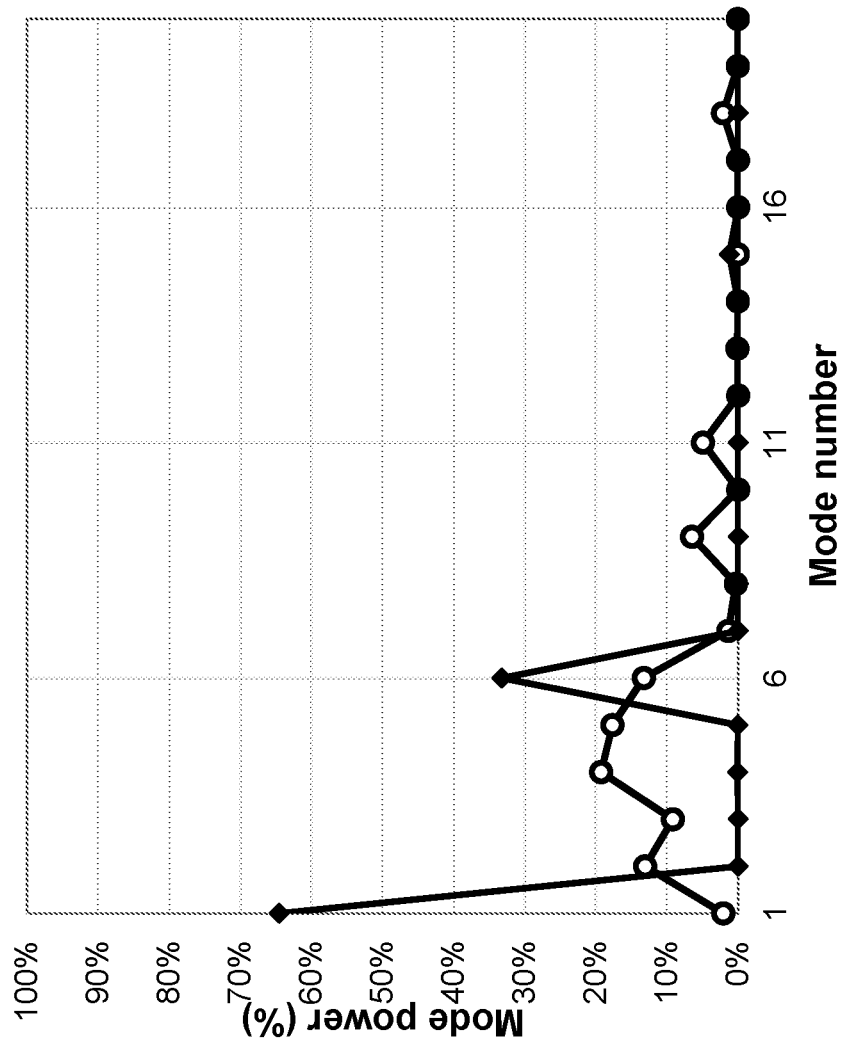
FIG. 46 is a graph of calculated mode power for various modes of the mode mixing fiber of Example 5 and of a conventional fiber.
Figure 45:
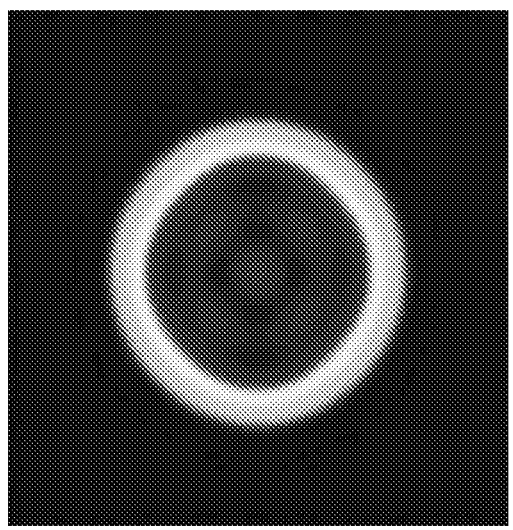
FIG. 45 is a graph of the simulated output of the experiment of Example 5.

The mode mixing performance of a 25 μm core mode mixing optical fiber (circular annular ring as a down-doped element, 0.175 NA, 8 μm inner diameter, 3.5 μm in thickness, 3 μm offset from core center, core vs. cladding NA=0.22) was simulated. The simulated output of the mode mixing fiber at the end of a 5 m length is shown in FIG. 45. FIG. 46 presents the calculated mode power data for this fiber (open circles), as compared to a similar fiber without the down-doped element (solid triangles).

Example 6

Figure 48:
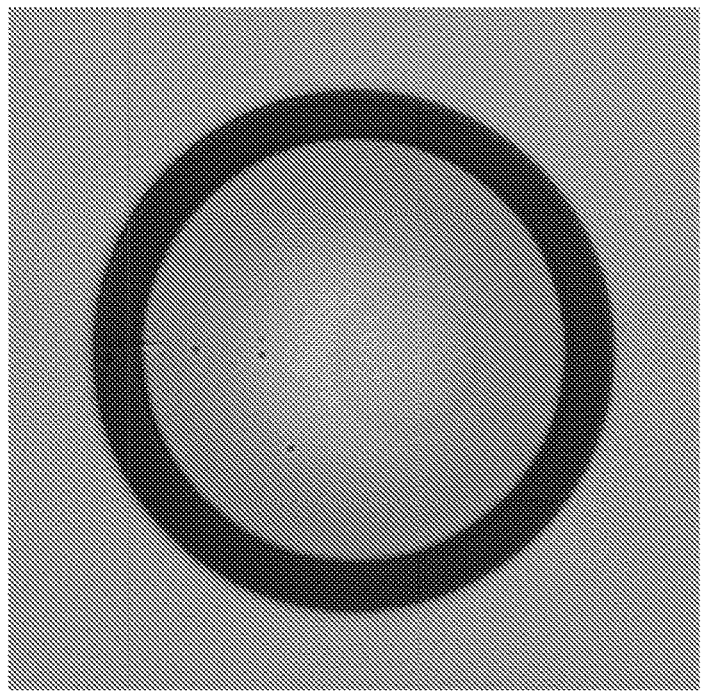
FIG. 48 is an image of a cleaved fiber endface of the optical fiber used in Example 6.
Figure 47:
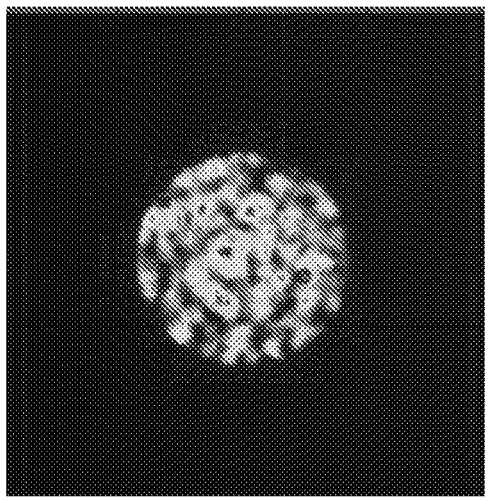
FIG. 47 is a graph of the output of a conventional pigtailed pump diode as described in Example 6.
Figure 49:
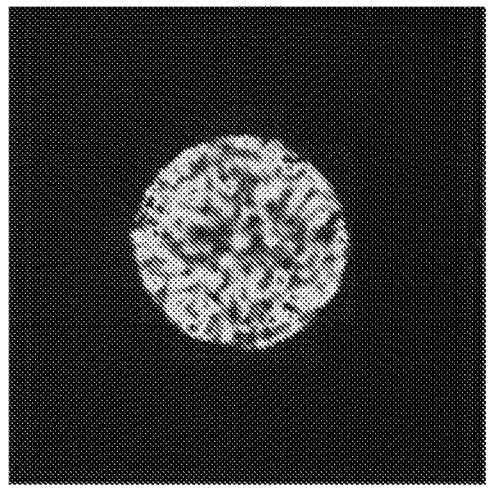
FIG. 49 is a graph of the output of a pump diode pigtailed with the example mode mixing optical fiber as described in Example 6.

The output of fiber-pigtailed L4 pump diode (915 nm, 0.5 m pigtail) was measured; a 2D graph is shown in FIG. 47. A 2-m length of a mode mixing optical fiber (105 μm core; 125 μm, core design similar to that described with respect to Example 3, cleaved fiber endface shown in FIG. 48) was spliced to the pigtail and the measurement was repeated; the output is shown in FIG. 49. Speckling is reduced by the use of the mode mixing optical fiber.

In the claims as well as in the specification above all transitional phrases such as "comprising", "including", "carrying", "having", "containing", "involving", and the like are understood to be open-ended. Only the transitional phrases "consisting of" and "consisting essentially of" shall be closed or semi-closed transitional phrases.

It is understood that the use of the term "a", "an" or "one" herein, including in the appended claims, is open ended and means "at least one" or "one or more", unless expressly defined otherwise. The occasional use of the terms herein "at least one" or "one or more" to improve clarity and to remind of the open nature of "one" or similar terms shall not be taken to imply that the use of the terms "a", "an" or "one" alone in other instance herein is closed and hence limited to the singular. Similarly, the use of "a part of", "at least a part of" or similar phrases (e.g., "at least a portion of") shall not be taken to mean that the absence of such a phrase elsewhere is somehow limiting.

Subsequently reference to the phrase "at least one", such as in the phrase "said at least one", to specify, for example, an attribute of the limitation to which "at least one" initially referred is not to be interpreted as requiring that the specification must apply to each and every instance of the limitation, should more than one be under consideration in determining whether the claim reads on an article, composition, machine or process, unless it is specifically recited in the claim that the further specification so applies.

The use of "or", as in "A or B", shall not be read as an "exclusive or" logic relationship that excludes from its purview the combination of A and B. Rather, "or" is intended to be open, and include all permutation, including, for example A without B; B without A, and A and B together, and as any other open recitation, does not exclude other features in addition to A and B.

Any of the features described above in conjunction with any one respect described above can be combined with a practice of the invention according to any other of the aspects described above, as is evident to one of ordinary skill who studies the disclosure herein.

Those of ordinary skill in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not expressly taught as mutually inconsistent, is included within the scope of the present invention.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. An optical system comprising
an active optical fiber having a pump wavelength and an active wavelength;
one or more pump sources configured to provide radiation of the pump wavelength; and
a mode mixing optical fiber, the mode mixing optical fiber having an input end operatively coupled to the one or more pump sources and an output end operatively coupled to the active optical fiber, the mode mixing optical fiber being configured for delivering optical radiation having the pump wavelength, the mode mixing optical fiber having a input end, an output end, a centerline and a refractive index profile, the mode mixing optical fiber comprising:
an innermost core for the radiation of the pump wavelength, the innermost core having a refractive index profile; and
a cladding disposed about the innermost core,
wherein the innermost core of the mode mixing optical fiber supports at least twenty guided modes at the pump wavelength, and
wherein the mode mixing optical fiber is configured to substantially distribute optical radiation having the pump wavelength propagating therein among a plurality of the guided modes.

2. The optical system according to claim 1, wherein the mode mixing optical fiber is configured to substantially distribute optical radiation of the pump wavelength such that at least 30% of the optical radiation is guided in a plurality of modes other than the fundamental mode.

3. The optical system according to claim 1, wherein the mode mixing optical fiber is configured to distribute optical radiation having the pump wavelength from being at least 70% guided in the fundamental mode to being at least 50% guided in a plurality of modes other than the fundamental mode.

4. The optical system according to claim 1, wherein the mode mixing optical fiber is configured to substantially distribute optical radiation of the pump wavelength such that at least 40% of the optical radiation is guided in a plurality of modes other than the fundamental mode or a first higher order mode (i.e., a mode that is a next higher mode compared to the fundamental mode).

5. The optical system according to claim 1, wherein the core includes one or more substantially down-doped regions.

6. The optical system according to claim 5, wherein one or more of the one or more substantially down-doped regions is disposed asymmetrically around the centerline of the core.

7. The optical system according to claim 1, wherein the core includes one or more substantially up-doped regions.

8. The optical system according to claim 1, wherein the cross-sectional profile of the mode mixing optical fiber is not circularly symmetric, and is formed as a helix along the length thereof.

9. The optical system according to claim 1, wherein the core supports at least forty modes at the wavelength.

10. The optical system according to claim 1, wherein the mode mixing optical fiber is configured to provide guided radiation at the wavelength having an intensity profile, as defined by an outer periphery at 5% of the peak intensity, having at least 70% of its cross-sectional area within about 20% of its average intensity.

11. A mode mixing optical fiber, configured as a multi-clad fiber, the mode mixing optical fiber having an input end, an output end, a centerline and a refractive index profile, the mode mixing optical fiber comprising:
an innermost core for radiation of an active wavelength, the innermost core being configured to generate radiation of the active wavelength when pumped with radiation of a pump wavelength, the innermost core having a refractive index profile;
a pump core surrounding the innermost core, wherein the pump core is configured to guide radiation having the pump wavelength; and
a cladding disposed about the pump core,
wherein the innermost core of the mode mixing optical fiber supports at least twenty guided modes at the active wavelength, and
wherein the mode mixing optical fiber is configured to substantially distribute optical radiation having the active wavelength propagating therein among a plurality of the guided modes.

12. An optical system comprising
a pump coupler or combiner having one or more pump input ports and an output port; and
an active optical fiber having a pump wavelength and an amplified wavelength, the active optical fiber having a first end operatively coupled to the output port of the pump coupler or combiner;
one or more pump sources configured to output radiation of the pump wavelength; and
one or more of mode mixing fibers, each of the mode mixing optical fibers having an input end operatively coupled to one of the one or more pump sources and an output end operatively coupled to one of the input ports of the pump coupler or combiner, each mode mixing optical fiber comprising:
an innermost core for radiation of the pump wavelength, the innermost core having a refractive index profile; and
a cladding disposed about the innermost core,
wherein the innermost core of the mode mixing optical fiber supports at least twenty guided modes at the pump wavelength, and wherein each of the mode mixing optical fibers is configured to substantially distribute optical radiation having the pump wavelength propagating therein among a plurality of the guided modes.

13. An optical system comprising
an active optical fiber having a pump wavelength and an active wavelength;
a seed optical source for the active wavelength; and
a mode mixing optical fiber, the core of the mode mixing optical fiber being passive, the mode mixing optical fiber being mode mixing for the active wavelength, the mode mixing optical fiber having an input end operatively coupled to seed optical source and an output end operatively coupled to the active optical fiber, the mode mixing optical fiber comprising:
an innermost core for radiation of the active wavelength, the innermost core having a refractive index profile; and
a cladding disposed about the innermost core,
wherein the innermost core of the mode mixing optical fiber supports at least twenty guided modes at the active wavelength, and wherein the mode mixing optical fiber is configured to substantially distribute optical radiation having the active wavelength propagating therein among a plurality of the guided modes.

14. An optical system comprising
a mode mixing optical fiber, the mode mixing optical fiber having a first end and a second end, the mode mixing optical fiber being an active mode mixing optical fiber comprising:
an innermost core for radiation of an active wavelength, the innermost core being configured to generate radiation of the active wavelength when pumped with radiation of a pump wavelength, the innermost core having a refractive index profile; and
a cladding disposed about the innermost core,
wherein the innermost core of the mode mixing optical fiber supports at least twenty guided modes at the active wavelength, and wherein the mode mixing optical fiber is configured to substantially distribute optical radiation having the active wavelength propagating therein among a plurality of the guided modes; and
one or more pump sources operatively coupled to the active core of the mode mixing optical fiber.

15. The optical system according to claim 14, further comprising a seed optical source for radiation of the active wavelength, the seed optical source being operatively coupled to the active core of the mode mixing optical fiber.

16. A method for providing amplified radiation comprising providing an optical system according to claim 12, and pumping the active optical fiber with radiation of the pump wavelength by transmitting radiation from the one or more pump sources through the one or more mode mixing fibers to the active optical fiber.

17. A method for providing amplified radiation comprising providing an optical system according to claim 1, and pumping the active optical fiber with radiation of the pump wavelength by transmitting radiation from the one or more pump sources through the mode mixing fiber to the active optical fiber.

18. A method for providing amplified radiation comprising providing an optical system according to claim 13, and transmitting seed radiation from the seed optical source through the mode mixing optical fiber to the active optical fiber.

19. A method for providing amplified radiation comprising providing an optical system according to claim 14, and transmitting pump radiation from the one or more pump sources to the mode mixing optical fiber, such that radiation of the active wavelength is generated in the innermost core of the mode mixing optical fiber and is distributed among a plurality of the guided modes of the innermost core of the mode mixing optical fiber.

20. The optical system according to claim 14, wherein the mode mixing fiber is configured as a multi-clad fiber, the mode mixing fiber further comprising a pump core surrounding the innermost core, wherein the pump core is configured to guide radiation having the pump wavelength, the cladding surrounding the pump core.

* * * * *